US012470864B2

(12) United States Patent
Anderson et al.

(10) Patent No.: US 12,470,864 B2
(45) Date of Patent: Nov. 11, 2025

(54) AUDIO SYSTEMS, DEVICES, AND METHODS

(71) Applicants: Dean Robert Gary Anderson, Orem, UT (US); Dean Anderson, Vernal, UT (US); Daniel Joseph Anderson, Chandler, AZ (US)

(72) Inventors: Dean Robert Gary Anderson, Orem, UT (US); Dean Anderson, Vernal, UT (US); Daniel Joseph Anderson, Chandler, AZ (US)

( * ) Notice: Subject to any disclaimer, the term of this patent is extended or adjusted under 35 U.S.C. 154(b) by 0 days.

(21) Appl. No.: 18/675,079

(22) Filed: May 27, 2024

(65) Prior Publication Data

US 2024/0334118 A1 Oct. 3, 2024

Related U.S. Application Data

(63) Continuation of application No. 18/097,224, filed on Jan. 14, 2023, now Pat. No. 11,997,450, which is a continuation of application No. 17/575,575, filed on Jan. 13, 2022, now Pat. No. 11,558,690.

(60) Provisional application No. 63/137,728, filed on Jan. 14, 2021, provisional application No. 63/231,240, filed on Aug. 9, 2021, provisional application No. 63/244,707, filed on Sep. 15, 2021.

(51) Int. Cl.
*H04R 1/28* (2006.01)
*H04R 19/01* (2006.01)

(52) U.S. Cl.
CPC ......... *H04R 1/2876* (2013.01); *H04R 1/2884* (2013.01); *H04R 19/016* (2013.01); *H04R 2201/003* (2013.01)

(58) Field of Classification Search
CPC .. H04R 1/2876; H04R 1/2884; H04R 19/016; H04R 1/30; H04R 2201/003; H04R 1/345; H04R 19/005; H04R 1/342; H04S 2420/01
See application file for complete search history.

(56) References Cited

FOREIGN PATENT DOCUMENTS

CN 107396269 A * 11/2017 ............. H04R 1/345

* cited by examiner

*Primary Examiner* — Tuan D Nguyen
(74) *Attorney, Agent, or Firm* — Daniel Anderson

(57) ABSTRACT

In one embodiment of an audio system, a transducer can be coupled to a passive acoustic directional amplifier to provide various benefits and improvements, including improvements to: speech intelligibility, signal-to-noise ratio, effective equivalent input noise, at-a-distance acoustic signal reception, and directional preference. In another embodiment, the shape of an interior surface of a passive acoustic directional amplifier is provided. In another embodiment, the material properties of an interior surface of a passive acoustic directional amplifier are provided.

12 Claims, 21 Drawing Sheets

AUDIO SYSTEMS, DEVICES, AND METHODS

CROSS-REFERENCE TO RELATED APPLICATIONS

This application is a continuation application of co-pending U.S. patent application Ser. No. 18/097,224, filed on Jan. 14, 2023, which was a continuation application of U.S. patent application Ser. No. 17/575,575, filed on Jan. 13, 2022, which issued as U.S. Pat. No. 11,558,690 on Jan. 17, 2023, and which claims the benefit of priority from: U.S. Provisional Patent Application Ser. No. 63/137,728 filed on Jan. 14, 2021, U.S. Provisional Patent Application Ser. No. 63/231,240 filed on Aug. 9, 2021, and, U.S. Provisional Patent Application Ser. No. 63/244,707 filed on Sep. 15, 2021. The disclosure of all aforementioned applications are hereby incorporated by reference.

BACKGROUND

Dean R. G. Anderson is the epitome of a "garage inventor." Over the past 27 years Dean has worked tirelessly from his home conducting research, and developing products, in a variety of technology fields. In 1994, Dean developed a novel image processing algorithm which he implemented in software to improve the quality of color printers. Around 1997, Dean began developing a new technology that enabled large format printers to print with oil paints in lieu of costly inks. Dean was awarded eight U.S. patents directed to his inventions covering these printing technologies. These patents were later sought-after and acquired by a multinational Fortune 100 company.

In 2006, Dean turned his research focus toward engraving technology and began developing software to facilitate the creation of digital images that could be used to generate engraving plates. Again, Dean was granted a U.S. patent covering his unique innovations.

Beginning in 2009, Dean decided to look into the field of audiology. His wife, Linda, has profound hearing loss and was unhappy with the performance of her hearing aids. Over the course of decades, she had tried numerous different brands of hearing aids and spent thousands of dollars, but still had a very difficult time understanding speech.

Their son, Dean G. Anderson, a medical doctor, joined his father's research efforts beginning in 2010. Together, father and son, Dean and Dean researched the physiology of hearing, speech and linguistics, psychoacoustics, the physics of sound, the acoustic properties of materials, signal processing, and the engineering of audio devices and systems.

Over the following years, Dean and Dean were awarded a combined total of 11 patents covering methods, devices, and systems for measuring hearing loss, fitting hearing aids, processing analog and digital signals, generating synthetic speech signals, and improving the speech intelligibility of audio generated by devices and systems. They were assisted in their patenting efforts by another of Dean's sons, Daniel J. Anderson, who became a patent attorney in 2013.

As a family, the Andersons have worked together to develop and protect revolutionary audio technology that has already helped many individuals to enjoy better hearing, and most importantly, to understand speech again.

This present invention relates, in general, to electronics and, more particularly, to audio systems that comprise one or more transducers, microphones, or sensors.

Microphones and ultrasonic sensors are transducers that convert sound energy into an electrical signal. Microphone self-noise, also known as equivalent input noise (EIN), is an electrical signal which a microphone or sensor produces of itself. Microphone EIN can occur even when no sound source is present. Microphone EIN is a problem in many audio systems because it introduces unwanted noise and decreases the signal-to-noise ratio (SNR) of a microphone. For example, the noise generated by microphone EIN can be distracting to users of audio systems and can make it difficult for users of an audio system to understand the intended signal. Generally, microphones that are rated with lower EIN and higher SNR are expensive, large diaphragm, condenser-type microphones.

MEMS (MicroElectroMechanical Systems) microphones are variants of the condenser microphone design. In a MEMS microphone, a pressure-sensitive diaphragm can be etched directly into a silicon wafer by MEMS processing techniques. MEMS microphones can be very small and inexpensive. Conventional MEMS microphones, however, suffer from relatively high EIN figures. Conventional MEMS microphones are also omni-directional, meaning that they show no preference for incoming signal direction. Currently, in order to achieve directional preference with MEMS microphones, an array of MEMS microphones and signal processing techniques must be implemented.

Conventional MEMS microphones may have an EIN of about 25 dBA to about 35 dBA (A-weighted decibels, abbreviated dBA, are an expression of relative loudness of sounds in air as perceived by the human ear). High-cost, large diaphragm condenser microphones, on the other hand, may have an EIN of about 6 dBA to about 16 dBA.

Accordingly, it is desirable to have a low-cost microphone, sensor, or transducer system that exhibits, among other things, high SNR and low effective EIN. It would be desirable that such a system exhibit directional preference without requiring an array of microphones or sensors, or the associated requirement for increased signal processing. It would be beneficial for such a system to excel at both far-field and near-field audio applications. Furthermore, it would be beneficial for such a system to be physically configured to achieve high manufacturability and compact dimensions for small applications.

Figure 1A:
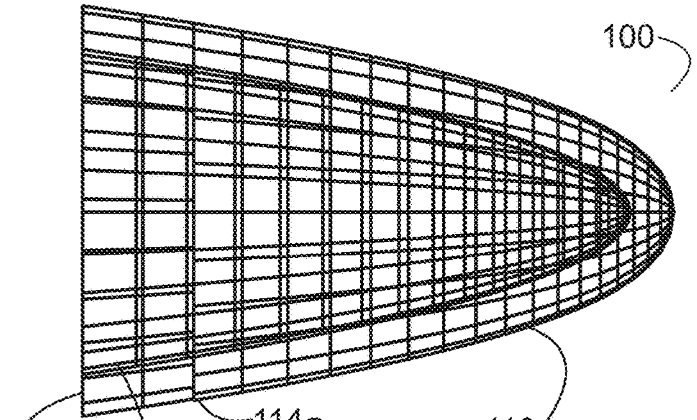
FIG. 1A illustrates a wire-frame side view of a passive acoustic directional amplifier in accordance with the present description.

Those skilled in the applicable arts appreciate that elements in the figures are illustrated for simplicity and clarity and have not necessarily been drawn to scale. Some elements in the figures may be exaggerated or minimized relative to other elements in order to help improve the understanding of the embodiments described herein. The same reference numbers in different figures may denote the same elements.

DETAILED DESCRIPTION

The drawings and detailed description are provided in order to enable a person skilled in the applicable arts to make and use the invention. The drawings and detailed description may focus on specific implementations and embodiments;

however, these specific implementations and embodiments are provided as examples and are not intended to restrict the scope of this disclosure. Descriptions and details of well-known steps and elements are omitted for simplicity of the description.

As used herein, the term and/or includes any and all combinations of one or more of the associated listed items. As used herein, the terms comprising, and/or including, when used in this specification and/or claims, are intended to specify a non-exclusive inclusion of the stated features, elements, steps and/or components, and do not preclude the presence or addition of one or more other features, elements, steps and/or components. It will be understood that, although the terms first, second, etc. may be used herein to describe various features, elements, values, ranges, steps, components and/or dimensions, these features, elements, ranges, values, steps, components, and/or dimensions should not be limited by these terms. The terms first, second, etc. are only used to distinguish one feature, element, range, value, step, component, and/or dimension from another. Thus, for example, a first element or a first dimension as described below, could also be termed as a second element or a second dimension without departing from the teachings of the present disclosure.

As used herein, the term range, may be used to describe a set of values having an approximate upper and approximate lower bound, however, the term range may also indicate a set of values having an approximate lower bound and no defined upper bound, or an upper bound which is defined by some other characteristic of the system. The term range may also indicate a set of values having an approximate upper bound and no defined lower bound, or a lower bound which is defined by some other characteristic of the system. Reference to "one embodiment" or "an embodiment" means that a particular feature, structure, or characteristic described in connection with the embodiment is included in at least one embodiment of the present disclosure. Thus, appearances of the phrases "in one embodiment" or "in an embodiment" in various places throughout this specification are not necessarily all referring to the same embodiment, but in some cases they may.

The use of words about, approximately, generally, or substantially means a value of an element is expected to be close to a stated value or position. However, as is well known in the art there are always minor variances preventing values or positions from being exactly stated. At a minimum, values within +/−10% of a stated value can be considered about, approximately, generally, or substantially equal to a stated value.

It is further understood that the embodiments illustrated and described hereinafter suitably may be practiced in connection with elements that are not specifically disclosed herein. Furthermore, it is understood that embodiments illustrated and described hereinafter also include variations wherein one or more of the illustrated or described elements may be omitted.

As used herein, the term human audible frequencies can refer to a range of frequencies associated with the range of frequencies generally audible to humans, for example, from about 20 Hertz ("Hz") to about 20,000 Hz.

As used herein, the term acoustical frequencies can refer to any frequency or frequency range where the invention described herein may find application, including both human audible frequencies and ultrasonic frequencies.

As used herein, the terms ultrasonic or ultrasonic frequencies can refer to frequencies associated with ultrasonic applications, for example, frequencies above about 20,000

Hz. Ultrasonic frequencies can be used, for example, in systems and applications for object detection, distance measuring, location positioning, range finding, and navigation.

As used herein, the term metadata can refer to data that provides information about other data. For example, metadata could include acoustic location data where sound is used to determine the distance and/or direction of a sound source or a sound reflector. The derivation of such acoustic location metadata can be done actively or passively. Active acoustic location metadata may involve, for example, the creation of sound in order to produce an echo, which can then be analyzed to determine the location of the object in question such as with time-of-flight data. Passive acoustic location metadata may involve, for example, the detection of sound or vibration created by the object being detected, which can then be analyzed to determine the location of the object in question such as with differential amplitude data or with time difference of arrival data when using a microphone array.

As used herein, the terms associated with length, depth, or effective length can refer to a linear length as well as a coiled length, an unfolded length, an unbent length, an acoustic length, or a length that will be equal to or will be qualitatively consistent with a corresponding physical length for air-conduction sound propagation.

As used herein, the terms audio device or audio system can refer to a stand-alone system or a subsystem of a larger system. A non-limiting list of example audio systems and audio devices where the invention described herein may find application, includes: microphones, sensors, receivers, amplifiers, sound detectors, acoustic transducers, audio and/or video conferencing systems, audio recording systems, security and surveillance systems and tools, far-field audio detection and recording, smart speakers, radios, telephones, hearing aids, over-the-counter hearing aids, hearables, wearables, personal sound amplifiers, built-in microphone systems, MEMS microphones, condenser microphones, electret microphones, dynamic microphones, piezoelectric microphones, fiber-optic microphones, cell phones, smart phones, camcorders, video cameras, instruments with acoustic microphones, tablets, computers, laptops, televisions, vehicle infotainment systems, headsets, voice controlled systems, voice activated systems, acoustic virtual reality systems, acoustic detectors, ultrasonic sensors, sonar systems, ultrasonic systems, autonomous vehicle systems and/or methods, and subsystems within any of the above devices or systems. The examples and embodiments described herein can be applied to, or used within, any of the above-described audio devices or systems.

Multiple instances of examples or embodiments described or illustrated herein may be used within a single audio device or system. As an example, multiple instances of embodiments described or illustrated herein may enable a stereo audio device comprising a first instance of an embodiment for a right passive acoustic directional amplifier with MEMS microphone and a second instance of an embodiment for a left passive acoustic directional amplifier with MEMS microphone. In another example, multiple instances of embodiments described or illustrated herein may enable a virtual reality audio device comprising multiple instances of an embodiment with multiple passive acoustic directional amplifiers with MEMS microphones. In another example, multiple instances of embodiments described or illustrated herein may enable acoustic location systems and acoustic ranging systems The inventor is fully informed of the standards and application of the special provisions of 35 U.S.C. § 112 (f). Thus, the use of the words "function," "means" or "step" in the Detailed Description of the Invention or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for" and the specific function (e.g., "means for filtering"), without also reciting in such phrases any structure, material or act in support of the function. Thus, even when the claims recite a "means for . . . " or "step for . . . " if the claims also recite any structure, material, or acts in support of that means or step, or that perform the recited function, then it is the clear intention of the inventor not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the illustrated embodiments, but in addition, include any and all structures, materials, or acts that perform the claimed function as described in alternative embodiments or forms of the invention, or that are well known present or later-developed, equivalent structures, material, or acts for performing the claimed function.

In the following description, and for the purposes of explanation, numerous, specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software, hardware or a combination of both. It should be noted that there are many different and alternative configurations, devices, and technologies to which the disclosed inventions may be applied. Thus, the full scope of the invention is not limited only to the examples that are described herein.

It is noted that sound waves can be longitudinal waves because the constituent components (particles) of a medium through which a sound wave is propagated vibrate in a direction generally parallel to the direction that the sound wave propagates. These back-and-forth vibrations are imparted to adjacent neighbors by particle-to-particle interaction.

For purposes of the present disclosure, the angle of incidence of sound energy, or of sound waves, is measured with respect to a normal line that is perpendicular to a tangent line at a surface. Thus, sound energy or sound waves which travel in a direction that is generally parallel to a flat surface are described as having a high angle of incidence since the direction of travel forms about a 90-degree angle with respect to a normal line of the surface. On the other hand, sound energy or sound waves which travel in a direction generally perpendicular to a flat surface are described as having a low angle of incidence since the direction of travel forms about a 0-degree angle with respect to a normal line of the surface.

The sound absorption coefficient of a material ($\alpha$) is a value between 0 and 1 and is mathematically described as $\alpha=E_a/E_0$, where $E_0$ represents the value of an amount of sound energy directed at and reaching a material, and $E_a$ represents the amount of sound energy absorbed by the material as a result of $E_0$. The sound absorption coefficient of a material can vary according to the frequency of the sound(s) directed at the material. The sound absorption coefficient of a material can also vary according to the angle of incidence of the sound(s) directed at the material. Furthermore, the sound absorption coefficient can vary according to a material's physical properties such as thickness, hardness, elasticity, Young's modulus, density, surface roughness, etc. For example, dense, hard materials with smooth surfaces, tend to have weak sound absorption performance and strong reflecting power, whereas soft, rough surfaced, and/or porous materials can have strong sound absorbing performance and weak reflecting power.

Young's modulus (E) is a property of a material that measures the stiffness of a material. Young's modulus can be defined as the relationship between tensile stress (σ) and axial strain (ε) in the linear region of a stress-strain curve for a material under tension. Young's modulus can be described according to the following equation:

$$E=\sigma/\varepsilon$$

Values for Young's modulus are frequently expressed in gigapascals (GPa).

The hardness of a material can be described as a measurement of the material property that resists local plastic deformation as a result of indentation or abrasion forces. Various tests and scales can be used for measuring the hardness of a material. ASTM D2240 is a testing standard set by the American Society for Testing and Materials (ASTM), and defines test methods describing eight types of hardness measurement devices known as durometers: types A, B, C, D, DO, O, OO and M. These scales are sometimes described as Shore Hardness Scales and are frequently used to measure the hardness of plastics, polymers, elastomers, and rubbers. Some example Shore hardness values of common materials include: hard hats made from HDPE (Shore-D 70-75); hard skateboard wheels (Shore-A 90-99); automotive tire tread (Shore-A 65-75); pencil eraser (Shore-A 40-55); silicone rubber (Shore-A 5-50). The aforementioned values are provided only as examples. The hardness of most materials can be engineered to achieve a variety of different hardness values.

Sound pressure levels can be measured in units called decibels (abbreviated as dB). Sound levels diminish as the distance between a sound source and the sound receiver increases. For example, conversational speech measured as 65 dB at 50 centimeters away from a speaker is measured at 45 dB when measured from 500 centimeters away. Human speech is typically comprised of voiced and unvoiced sounds that are produced at a wide variety of frequencies.

The Stenger principle generally states that, if two tones having the same frequency are presented to the two cars of a person simultaneously, but one of the tones has greater intensity than the other tone, the car which receives the tone of the greater intensity will alone hear the tone.

Auditory masking can occur when the perception of one sound is affected by the presence of another sound.

A critical band is a band of audio frequencies where the perception of one tone will interfere with the perception of a second tone due to auditory masking. Critical bands have about ⅓ octave bandwidths.

The smallest angular separation at which two sounds are perceived as coming from distinct sources is called the Minimum Audible Angle (MAA). For normal hearing individuals, the MAA in the horizontal plane (azimuth) can be about 1° (1 degree in angle) and the MAA in the vertical plane (elevation) is about 4°.

A head-related transfer function (HRTF) is a response that characterizes how an ear receives a sound from a point in space.

The sensitivity of a microphone can be described as the electrical response at its output to a given standard acoustic input. The sensitivity tolerance between MEMS microphones is about ±1 dB, enabling high-performance microphone arrays to be constructed without the need for system sensitivity calibration.

Conventional parabolic microphones use a parabolic reflector to reflect sound waves onto the microphone transducer. Parabolic microphones have greater sensitivity to sounds along the axis of the dish. Small portable parabolic microphones lack high fidelity due to poor low-frequency response. Parabolic dishes can only focus sound waves with a wavelength much smaller than the diameter of their aperture due to Rayleigh criterion. A parabolic microphone dish with a diameter of one meter has little directivity for sound waves longer than 30 centimeters, corresponding to frequencies below 1000 Hertz, which includes the voiced portion of human speech and many orchestral instruments. Hence, a parabolic dish microphone with a diameter of one meter is less efficacious for frequencies below 1 kHz (1 kilohertz).

Shotgun microphones can be highly directional for certain frequencies. Shotgun microphones use multiport sound wave interference to reject unwanted sounds coming at the microphone from the sides and allow pickup of the desired sound source at which the microphone is pointed. The shotgun microphone polar sensitivity pattern can vary significantly as a function of frequency.

The ORTF (Office de Radiodiffusion Télévision Française) stereo microphone system, also known as Side-Other-Side, is a microphone technique used to record stereo sound. The NOS (Nederlandse Omroep Stichting) is a similar method of capturing stereo sound. Both ORTF and NOS can be useful for loudspeaker applications. For certain headphone and earbud applications, dummy head recording (also known as artificial head or Head and Torso Simulator) is another method for stereo (binaural) recordings. Dummy head recording can be used to simultaneously acquire sound sources from multiple locations for an exceptional playback experience.

In virtual reality (VR) systems, audio reproduction for the listener should, at a minimum, correspond to the listener's azimuthal head-turn. Reproducing head elevation change for the listener will also enhance an acoustic VR experience. Individualized mixing according to the user's Head-Related Transfer Function (HRTF) can further improve the VR experience.

DETAILED DESCRIPTION OF THE DRAWINGS

FIG. 1A illustrates a wire-frame side view of an amplifier 100, concave structure 100, cupped structure 100, or passive acoustic directional amplifier 100 that can be used in conjunction with one or more microphones, sensors and/or transducers as described hereinafter. Microphones, sensors and transducers include, but are not limited to, MEMS microphones, electret microphones, condenser microphones, and ultrasonic sensors. Passive acoustic directional amplifier 100 can be used in conjunction with many audio systems or devices in accordance with various embodiments described hereinafter. In the present example, passive acoustic directional amplifier 100 comprises a 3-dimensional structure 110. Passive acoustic directional amplifier 100 has an interior surface 112, which defines a cavity within passive acoustic directional amplifier 100, and an exterior surface 114. In some examples, exterior surface 114 can comprise a rim 132 or a facial surface 132 which abuts interior surface 112.

Figure 1B:
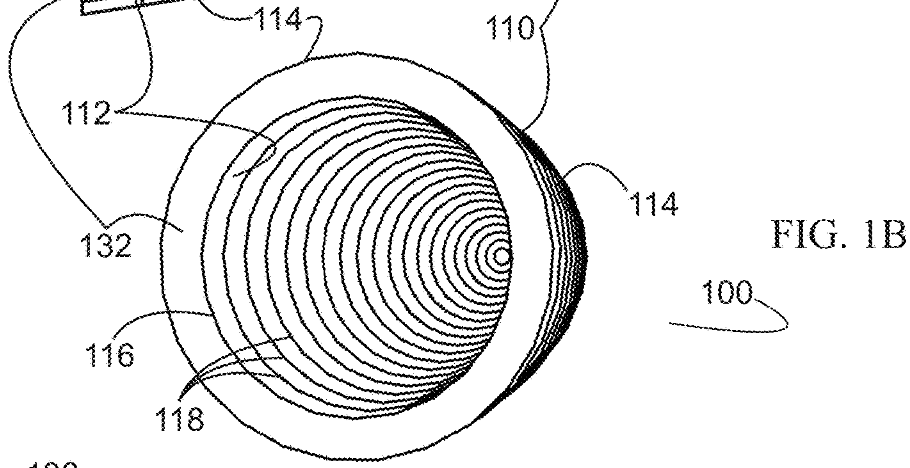
FIG. 1B illustrates a perspective view of a passive acoustic directional amplifier in accordance with the present description.

FIG. 1B illustrates a perspective view of passive acoustic directional amplifier 100. In the present example passive acoustic directional amplifier 100 comprises a 3-dimensional structure 110 or a structure 110. 3-dimensional structure 110 has an interior surface 112, which defines a cavity within passive acoustic directional amplifier 100, and an exterior surface 114. In some examples, exterior surface 114 can comprise a rim 132 or a facial surface 132 which abuts interior surface 112. In the present example, interior surface 112 forms a mouth 116 or an opening 116.

Referring to both FIGS. 1A and 1B, according to various embodiments, 3-dimensional structure 110 can be formed in many different shapes, for example, 3-dimensional structure 110 can have a rounded conical, rounded pyramidal, paraboloidal, rounded frustum, concave, bell, or cup-like shape. According to the present example, 3-dimensional structure 110 has interior surface 112 characterized by a first surface of revolution created by rotating a curve around an axis of rotation. Exterior surface 114 can be characterized by a second surface of revolution. The thickness of 3-dimensional structure 110 between interior surface 112 and exterior surface 114 can be characterized by a uniform or varying thickness.

According to various examples, passive acoustic directional amplifier 100 can be configured to have many different shapes, sizes, and dimensions. In some examples, the cavity formed by interior surface 112 can have any volume between about 1 milliliter (ml) and about 1 liter (L). For example, the cavity formed by interior surface 112 could have a volume of 1.1 ml, 2.1 ml, 4.2 ml, 7.9 ml, 25 ml, or 40 ml. The size of passive acoustic directional amplifier 100 will determine the amount of amplification gained for a microphone or sensor that is used in connection with passive acoustic directional amplifier 100. The shape of interior surface 112 and the material of which passive acoustic directional amplifier 100 is comprised will also affect the amount of amplification obtained by using passive acoustic directional amplifier 100 with a microphone or sensor.

According to various examples, 3-dimensional structure 110 of passive acoustic directional amplifier 100 may comprise one or more materials. In some embodiments, 3-dimensional structure 110 comprises a sound absorptive material that is a soft and/or elastic material. A nonlimiting list of examples materials from which 3-dimensional structure 110 could be constructed, includes: platinum-catalyzed silicone, silicone rubber, butyl rubber, nitrile butadiene rubber, styrene-butadiene rubber, polyurethane elastomer, hydrogel, interpenetrating polymer networks, gradient polymers, and polymer foams. In some examples, 3-dimensional structure 110 may comprise a polymer with one or more different types of inclusions that are introduced into the polymer matrix to transform the polymers into sound absorption materials via, for example, air voids, solid inclusions, nanofillers, phononic crystals or other inclusions.

In many examples, 3-dimensional structure 110 comprises a material having a hardness that is less than or equal to a Shore-A hardness of 100 (or an equivalent measure of hardness). In some example, 3-dimensional structure comprises a material having a hardness that is less than or equal to a Shore-A hardness of 75. In a preferred example, 3-dimensional structure comprises a material having a hardness that is less than or equal to a Shore-A hardness of 50.

In many examples, 3-dimensional structure 110 comprises a material having a Young's modulus that is less than or equal to 0.5 GPa (or an equivalent measure of stiffness/elasticity). In a preferred example, 3-dimensional structure 110 comprises a material having a Young's modulus that is less than or equal to 0.1 GPa (or an equivalent measure of stiffness/elasticity).

In many examples, 3-dimensional structure 110 can comprise a sound absorptive material. In some examples, 3-dimensional structure can comprise a material having a sound absorption coefficient greater than or equal to 0.15 for sound at a frequency of 2,000 Hz that is generally directed at a 0-degree angle with respect to a normal line of the surface of the material. In a preferred example, 3-dimensional structure can comprise a material having a sound absorption coefficient greater than or equal to 0.25 for sound at a frequency of 2,000 Hz that is generally directed at a 0-degree angle with respect to a normal line of the surface of the material.

According to an embodiment, exterior surface 114 can comprise a first material having a first sound absorption coefficient which forms a shell surrounding interior surface 112 which can be comprised of a second material having a second sound absorption coefficient. In some examples, exterior surface 114 may have a rough exterior surface that can enhance sound absorption properties of a sound absorbing material. In some examples, interior surface 112 may have a rough interior surface that can enhance sound absorption properties of a sound absorbing material.

In one example, interior surface 112 can extend uniformly outwards toward exterior surface 114 such that 3-dimensional structure 110 has a generally uniform thickness of about 5 millimeters and 3-dimensional structure 110 can be comprised of platinum-catalyzed soft silicone rubber with a Shore-A hardness of about 8.

3-dimensional structure 110 can be formed by various methods including milling, molding, casting, vacuum forming, thermoforming, blow molding, injection molding, extrusion, 3D printing, additive manufacturing, or other methods as known to those skilled in the art.

Referring to FIG. 1B, opening 116, interior surface 112, and interior surface elevations 118 (many shown) are illustrated as generally circular (actually shown as icositetragons). However, one of skill in the art will recognize that opening 116, interior surface 112, and interior surface elevations 118 may be formed as one or more different shapes, including for example, elliptical shapes, circular shapes, rectangular shapes, triangular shapes, pentagonal shapes, regular or irregular polygonal or n-gonal shapes, or other shapes which result in net sound wave compression. According to an embodiment, interior surface 112 can have an overall shape approximating interior surface elevations 118 along the length of structure 110, and the shapes of interior surface elevations 118 may vary along the length of structure 110.

According to many examples, one or more holes may also be formed in 3-dimensional structure 110 which can extend from interior surface 112 to exterior surface 114. The one or more holes can be used as openings or passages for wires, cables, or other connectors to electrically couple one or more components of an audio system located within the cavity formed by interior surface 112 to one or more components of an audio system located outside of the cavity formed by interior surface 112. For example, a transducer located within the cavity formed by interior surface 112 can be coupled to one or more other electronic components located outside of the cavity formed by interior surface 112 via wires, cables, or other connectors that pass through an opening or hole in 3-dimensional structure 110. In some examples, a hole is located near the bottom of the cavity formed by interior surface 112.

According to various embodiments, a plurality of passive acoustic directional amplifiers 100 can be arranged in an approximate spherical shape, hemispherical shape, or some other complex 3-dimensional structure. For example, a superstructure comprising twelve passive acoustic directional amplifiers 100 can be formed by orienting twelve passive acoustic directional amplifiers in a group with each of the passive acoustic directional amplifiers projecting outward from a common central point at an angle approximately equal to a line perpendicular to each face of a dodecahedron centered about the common central point. Similarly, twenty passive acoustic directional amplifiers could be arranged to approximate an icosahedron, or ten passive acoustic directional amplifiers could approximate a hemi-icosahedron.

Figure 1C:
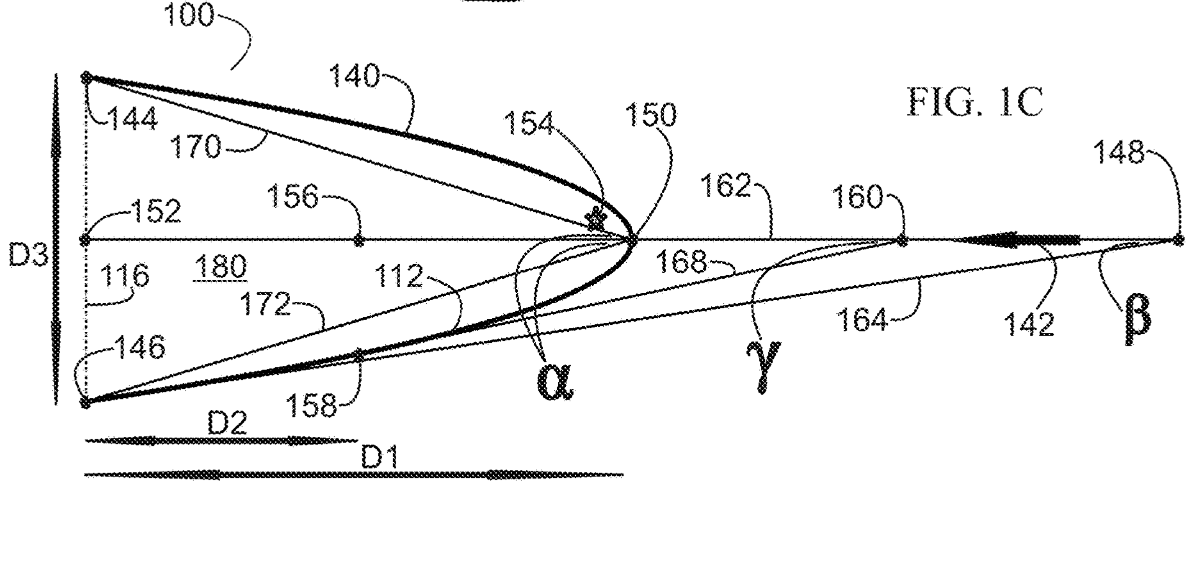
FIG. 1C illustrates a 2-dimensional cross-section view of a passive acoustic directional amplifier in accordance with the present description.

FIG. 1C illustrates a 2-dimensional cross-section view of a portion of a passive acoustic directional amplifier 100. Passive acoustic directional amplifier 100 comprises an interior surface 112. According to various embodiments, interior surface 112 can be characterized by a line 140, a function 140, or a curve 140 rotated around an axis 142 creating an opening 116 at a front edge of passive acoustic directional amplifier 100. According to various embodiments, the shape of curve 140, or shape of interior surface 112, can be defined by many different techniques, functions, formulas, or mathematical descriptions without departing from the teachings of the present disclosure. According to various examples, interior surface 112 can form a cup-like shape. In some examples, curve 140 may be defined by three control points: 144, 146, and 148. For example, curve 140 may be represented by a spline curve where control points 144 and 146 are anchor points and control point 148 is equally distant from control points 144 and 146. According to some examples, the distance between the control point 148 and anchor point 144 is equal to a value between two to six times the distance between anchor point 144 and anchor point 146. For example, the distance between the control point 148 and anchor point 144 can be equal to about 5.458 multiplied by the distance between anchor point 144 and anchor point 146. In another example, the distance between control point 148 and anchor point 144 can be about 3.405 times the distance between anchor points 144 and 146. In another example, the distance between control point 148 and anchor point 144 can be any value that is greater than two times the distance between anchor points 144 and 146.

Still referring to FIG. 1C, front edge point 152, midpoint 152, or centroid 152 represents a midpoint between anchor control points 144 and 146. Line 162 is a line between midpoint 152 and control point 148 and is collinear with central axis 142. Bottom point 150, interior surface vertex 150, or maximum distant point 150 is a point furthest from midpoint 152 on curve 140 along line 162 and corresponds to a point at the bottom of a cavity 180 defined by interior surface 112. Depth D1 represents the distance between midpoint 152 and maximum distant point 150. Mid-depth point 156 represents a midpoint between midpoint 152 and maximum distant point 150 along line 162, which corresponds to a point at ½ the depth of cavity 180 defined by interior surface 112. Depth D2 represents the distance between midpoint 152 and mid-depth point 156. Line 170 represents a line between anchor control point 144 and maximum distant point 150. Line 172 represents a line between anchor control point 146 and maximum distant point 150. An interior surface mid-depth point 158 represents a point on curve 140 which is perpendicular from line 162 at midpoint 156. Interior surface mid-depth point 158 also corresponds to a point (or a set of all points or a line) on interior surface 112 which is perpendicular to mid-depth point 156 at ½ the depth of cavity 180 defined by interior surface 112. According to some examples, greater than or equal to 60% of the total surface area of interior surface 112 is located between opening 116 and interior mid-depth line 158. According to some examples, D1 is equal to a value that is greater than or equal to 1.5*D3 (i.e. the value equal to the product of D3 and 1.5).

According to some examples, interior surface 112 generally forms a paraboloid. The focus or focal point of the paraboloid is within the cavity 180. In a preferred embodiment, the focus or focal point of the paraboloid is within the cavity and is located at a point between maximum distant point 150 and midpoint 156.

According to some examples, a first tangential line 164 represents a line between anchor control point 146 and control point 148. First tangential line 164 is tangential to curve 140 at, or very near, anchor control point 146 and tangential to interior surface 112 at, or very near, anchor control point 146. In three dimensions, first tangential line may also be represented by a first tangential plane 164. An angle β is the angle measured between first tangential line 164 and central axis 142. A second tangential line 168 represents a line which is tangent to interior surface 112 at interior surface mid-depth point 158 and intersects line 162 at point 160. Again, in three dimensions, second tangential line 168 may also be represented by a second tangential plane 162. An angle γ is the angle measured between second tangential line 168 and central axis 142. According to one embodiment, angle β is equal to about 3° (3 degrees) and angle γ is equal to about 4°. According to another embodiment, angle β is equal to about 3.5° and angle γ is equal to about 5°. According to another embodiment, angle β is equal to about 5° and angle γ is equal to about 7°. According to another embodiment, angle β is equal to about 7° and angle γ is equal to about 10°. According to another embodiment, angle β is equal to about 10° and angle γ is equal to about 14°. According to another embodiment, angle β is equal to about 12° and angle γ is equal to about 17°. According to some examples, greater than or equal to about 60% of the interior surface area of an interior surface 112 of passive acoustic directional amplifier 100 has a tangent line (or tangent plane) that creates an angle (or minimum angle in the case of a tangential plane) between 0° and about 20° when measured with respect to central axis 142. According to some examples, greater than or equal to 60% of the interior surface area of an interior surface 112 of passive acoustic directional amplifier 100 has a tangent line (or tangent plane) that creates an angle (or minimum angle in the case of a tangential plane) between about 3° and about 17° when measured with respect to central axis 142.

According to one example for a passive acoustic directional amplifier 100, the distance between anchor control points 144 and 146 can be about 38 millimeters; control point 148 can be about 129.4 millimeters equal distant from anchor control points 144 and 146; and, resulting spline curve 140 can extend about 64 millimeters at maximum distant point 150 from midpoint 152. According to this example, an angle, α, formed between line 172 and line 162 can be about 16.5° and can also be referred to as a half-angle for a passive acoustic directional amplifier. According to this example, an angle, β, formed between tangent line 164 and line 162 can be about 8.4°. According to this example, an angle, γ, formed between tangent line 168 and line 162 can be about 11.9°. According to this example, opening 116 of passive acoustic directional amplifier 100 has a circular diameter D3 of about 38 millimeters and passive acoustic directional amplifier 100 has a depth D1 of 64 millimeters.

In some examples for a passive acoustic directional amplifier 100, angle α formed between line 172 and line 162 can be about equal to a value less than 35°. In a preferred embodiment, angle α, can be less than or equal to about 20°.

According to another example for a passive acoustic directional amplifier 100, the distance D3 between anchor control points 144 and 146 can be about 19.6 millimeters; control point 148 can be about 107 millimeters equal distant from anchor control points 144 and 146; and, resulting spline curve 140 can extend about 53.3 millimeters at maximum distant point 150 from midpoint 152. According to this example for passive acoustic directional amplifier 100, an angle, α, formed between line 172 and line 162 can be about 10.4° and can also be referred to as a half-angle for a passive acoustic directional amplifier. According to this example, an angle, β, formed between tangent line 164 and line 162 can be about 5.3° and an angle, γ, formed between tangent line 168 and line 162 can be about 7.4°. According to this example, opening 116 of passive acoustic directional amplifier 100 has a circular diameter D3 of about 19.6 millimeters and passive acoustic directional amplifier 100 has a depth D1 of about 53.3 millimeters.

According to another example for a passive acoustic directional amplifier 100, the distance D3 between anchor control points 144 and 146 can be about 14 millimeters; control point 148 can be about 54.7 millimeters equal distant from anchor control points 144 and 146; and, resulting spline curve 140 can extend about 54.2 millimeters at maximum distant point 150 from midpoint 152. According to this example for passive acoustic directional amplifier 100, an angle, α, formed between line 172 and line 162 can be about 14.5° and can also be referred to as a half-angle for a passive acoustic directional amplifier. According to this example, an angle, β, formed between tangent line 164 and line 162 can be about 7.4° and an angle, γ, formed between tangent line 168 and line 162 can be about 10.3°. According to this example, opening 116 of passive acoustic directional amplifier 100 has a circular diameter D3 of about 14 millimeters and passive acoustic directional amplifier 100 has a depth D1 of about 27.1 millimeters.

According to another example for a passive acoustic directional amplifier 100, the distance D3 between anchor control points 144 and 146 can be about 12 millimeters; control point 148 can be about 40.5 millimeters equal distant from anchor control points 144 and 146; and, resulting spline curve 140 can extend about 40 millimeters at maximum distant point 150 from midpoint 152. According to this example for passive acoustic directional amplifier 100, an angle, α, formed between line 172 and line 162 can be about 16.7° and can also be referred to as a half-angle for a passive acoustic directional amplifier. According to this example, an angle, β, formed between tangent line 164 and line 162 can be about 8.5° and an angle, γ, formed between tangent line 168 and line 162 can be about 12°. According to this example, opening 116 of passive acoustic directional amplifier 100 has a circular diameter D3 of about 12 millimeters and passive acoustic directional amplifier 100 has a depth D1 of about 20 millimeters.

According to various embodiments, passive acoustic directional amplifier 100 also comprises a sensor 154, microphone 154 or transducer 154, such as an ultrasonic sensor, an electret microphone, a condenser microphone, or a MEMS microphone. In some examples, transducer 154 can be located within cavity 180. According to some examples, transducer 154 is located within a lower portion of cavity 180 at a point between mid-depth point 156 and maximum distant point or bottom point 150. According to some examples, transducer 154 is located at or near a bottom point 150 of the cavity 180. According to one example, transducer 154 can comprise a MEMS microphone 154 having a port hole that is positioned within 8 millimeters of bottom point 150 of cavity 180. According to another example, the port hole of a MEMS microphone can be positioned within 15 millimeters of bottom point 150 of cavity 180.

According to another embodiment, the port hole of a MEMS microphone 154 can be positioned within 4 millimeters of the interior surface vertex or maximum distant point 150 of the passive acoustic directional amplifier 100.

According to one embodiment of a passive acoustic directional amplifier 100 having an interior cavity 180 of about 7.9 mL, in a mixed-use residential room, air-conduction acoustic waves were compressed to yield approximately 16.2 dB of directional gain from a white noise sound source (20 Hz to 20 kHz) one meter distant in the direction pointed to by axis 142. Rotating this passive acoustic directional amplifier 100 embodiment horizontally into other "off-axis" orientations from this same white noise sound source one meter distant yielded the following attenuated gains: 15°=15.7 dB; 30°=14.2 dB; 45°=12.1 dB; 60°=9.1 dB; 75°=7.1 dB; 90°=6.6 dB; 105°=5.0 dB; 120°=4.5 dB; 135°=4.1 dB; 150°=4.4 dB; 165°=5.5 dB; and 180°=4.2 dB. In this example, a white noise sound source was used to mitigate the effects of standing waves in the room. The dB gain measurements were relative to the same omni-directional microphone in the same orientations without the use of passive acoustic directional amplifier 100. Using *American National Standard Methods for Calculation of the Speech Intelligibility Index* (ANSI S3.5-1997) and the one-third octave band speech intelligibility index (SII) procedure, in this configuration, passive acoustic directional amplifier 100 with an exemplary hearing aid microphone increased SII to 0.98644 compared to an SII of 0.7629 for the same microphone without the passive acoustic directional amplifier 100 at a normal speech level (62.35 dB SPL), at 1 meter distance between the speaker's mouth and the microphone; and where the only noise conditions consisted of the microphone manufacturer's specified one-third octave equivalent noise levels. Using this configuration of passive acoustic directional amplifier 100 yielded a 29% increase in available speech cues for a listener.

According to many examples, passive acoustic directional amplifier 100 can be relatively small and can be used beneficially in many applications such as hearing aids, personal sound amplifiers, smart speakers, cell phones, vehicle infotainment systems, acoustic surveillance systems, or ultrasonic sensor systems for vehicles. According to some examples, passive acoustic directional amplifier 100 can be held in the palm of the hand and grasped with the fingers so as to be almost concealed and made unobtrusive. According to such an embodiment, holding passive acoustic directional amplifier 100 in the palm of the hand and grasped with the fingers can further enhance the "off-axis" sound shadowing and sound deadening characteristics of a sound absorbing material, such as soft silicon rubber, of exterior surface 114 for sound sources emanating from such "off-axis" directions. Furthermore, the relatively small size of passive acoustic directional amplifier 100 can enable a multiplicity of such devices to be configured in a multiplicity of orientations within or about a dummy head to facilitate dummy head recording for a multiplicity of "fixed in space" perspectives.

In reference to FIGS. 1A, 1B, and 1C, it is noted that sound sources emanating from different positions and/or directions relative passive acoustic directional amplifier 100 will approach and interact with interior surface 112 at different angles of incidence. For many materials, the amount of sound energy absorbed by the material from a particular sound wave can vary as a function of the angle of incidence of the particular incoming sound wave. Thus, both the material selection, texture, and interior shape design of passive acoustic directional amplifier 100 can be configured to increase or decrease the directional sensitivity of passive acoustic directional amplifier 100. According to some examples, the shape of interior surface 112 can result in a high angle of incidence (e.g., >45°) for the majority of sound sources emanating from a location in front of passive acoustic directional amplifier 100 and within approximately 15° of axis 142; and can result in a lower angle of incidence for the majority of sound sources emanating from all other locations. It is noted that certain materials will also contribute to the directional sensitivity of passive acoustic directional amplifier 100. For example, some materials can demonstrate low sound absorption and high reflectivity for sound energy which approaches interior surface 112 at a high angle of incidence. The same material may also demonstrate a higher sound absorption and lower reflectivity for sound energy which approaches interior surface 112 at a low angle of incidence. As mentioned previously herein, soft silicone rubber is an example of a material which demonstrates such differential reflectivity so as to improve the directional sensitivity of passive acoustic directional amplifier 100. Other materials can be used to form passive acoustic directional amplifier without departing from the teachings of the present disclosure. It is noted that designs for the shape and/or texture of exterior surface 114 can be varied and still achieve the objectives of the present description.

In accordance with the present description, the amplification achieved by passive acoustic directional amplifier 100 is due, in part, to the shape, texture, collapsing volume, and the absorption and reflectivity attributes of the material composition of interior surface 112. Accordingly, the shape of interior surface 112 can determine compression efficiency and directional gain for a passive acoustic directional amplifier 100. Various designs for interior surface 112, including different shapes, curves and/or piecewise segments, may be implemented and/or combined to yield various degrees of compression efficiency and directional gain. According to an embodiment, the shape of interior surface 112 used for compression efficiency and directional gain can resemble that of a concave rocket nozzle shape. The shape of interior surface 112 and the sound absorption coefficient of the material comprising interior surface 112 can be designed so that sound sources emanating from the direction pointed to by axis 142 will have a high angle of incidence resulting in lower sound absorption and higher reflectivity compared to sound sources emanating from the other "off-axis" directions. For many materials, the sound absorption coefficient of a material varies as a function of frequency, thus, the material comprising interior surface 112 may also be configured to exploit the unequal reflection or absorption of different frequency ranges depending on application. The result of such material selection may be the amplification of certain desirable frequency ranges along with the attenuation of other frequency ranges.

According to various embodiments, the use of passive acoustic directional amplifier 100 with microphone or sensor, can effectively lower the EIN of the transducer. An acoustic signal can be amplified prior to the acoustic signal being converted to an electric signal by a transducer, microphone or ultrasonic detector. The resulting electric signal can then be attenuated to correspond to the original acoustic signal. This attenuation will also attenuate the microphone self-noise to achieve an effective lowering of the EIN of the transducer.

According to various embodiments, 3-dimensional structure 110 of the passive acoustic directional amplifier 100 may also comprise one or more substructures, supports, skeleton, framing, slots, holes and/or components to provide shape, rigidity, or durability to the passive acoustic directional amplifier. As one example, 3-dimensional structure 110 may also comprise sub-elements or materials within its structure to increase the stiffness of the deformable nature of certain sound absorbing material. According to various embodiments, a design for an exterior surface 114 may comprise other structures and components such as mounting hardware, connectors or adhesives.

According to various embodiments, in addition to a transducer, other electrical elements and/or components may also be enclosed within the interior surface 112 of the 3-dimensional structure 110 of the passive acoustic directional amplifier 100. According to many examples, one or more components, such as a circuit board, a transducer, a processor, a digital signal processor, wiring, cabling, a battery, electrical connectors, an antenna, a transmitter, a transceiver, intermediate structures, materials, and/or attachment mechanisms, can be located within the cavity formed by interior surface 112 of passive acoustic directional amplifier 100, and passive acoustic directional amplifier 100 can still achieve amplification and other benefits described herein.

In one embodiment, a transmitter or transceiver can be located at least partially within the cavity formed by interior surface 112 of passive acoustic directional amplifier 100 and can be configured to transmit a signal corresponding to the signal generated by a transducer within the cavity formed by interior surface 112. The signal may be transmitted to a receiver located external to passive acoustic directional amplifier 100 by known wireless techniques such as radio, Bluetooth, Wi-Fi, etc.

In some examples, transducer 154 can be integrated or embedded into 3-dimensional structure 110. In such examples, transducer 154 comprises a port hole opening which is exposed to cavity 180. Additionally, transducer 154 can also comprise electrical contacts or connectors which are exposed at, or protrude from, an exterior surface 114 of 3-dimensional structure 110.

According to various embodiments, axis 142 may not be linear and may have a bending structure and still achieve amplification and other effects of a passive acoustic directional amplifier 100. In an embodiment, passive acoustic directional amplifier 100 with a non-linear axis 142 can be configured to wrap around the back side of the pinna of a user. In another embodiment, passive acoustic directional amplifier 100 with a non-linear axis 142 can be configured to wrap around the wrist of a user. In many examples where passive acoustic directional amplifier 100 comprises a deformable or flexible material, such as soft silicone rubber, passive acoustic directional amplifier 100 can be deformed or flattened to conform to a particular configuration and still achieve amplification and other benefits described herein.

Figure 2:
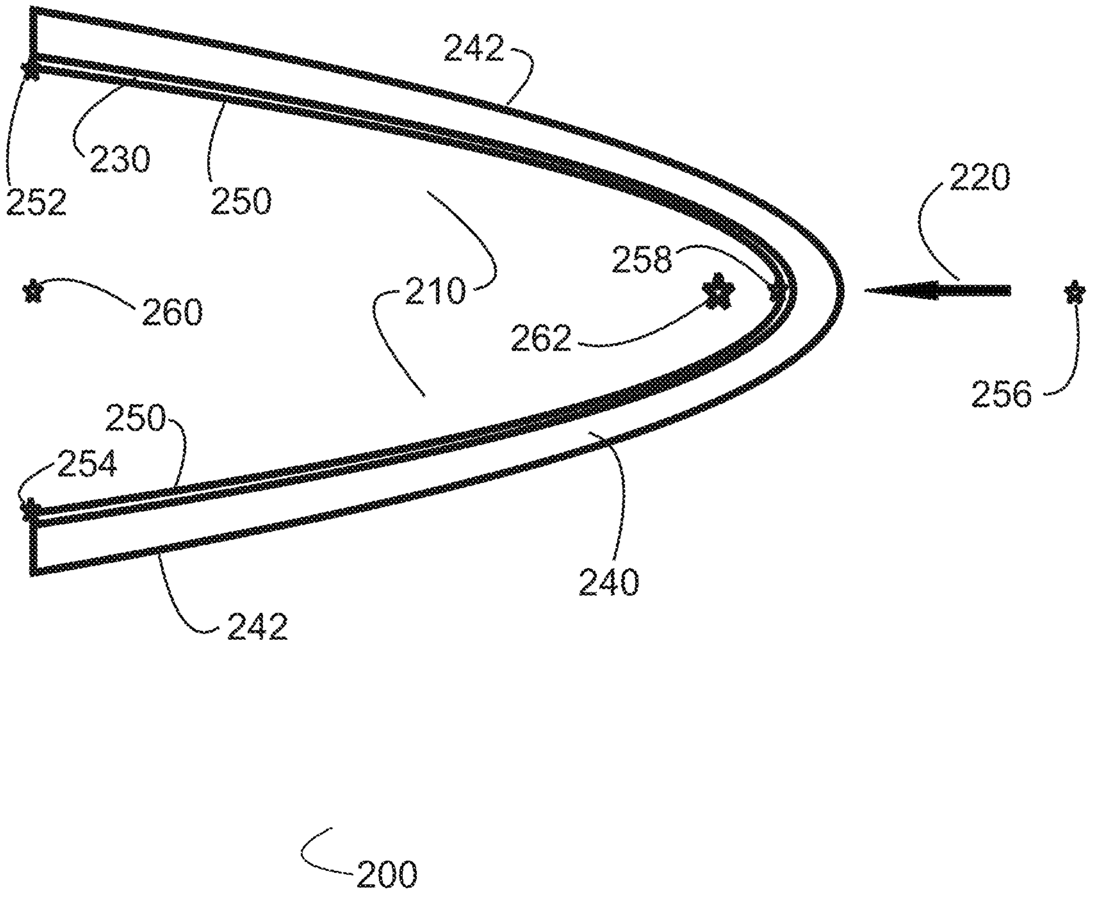
FIG. 2 illustrates a 2-dimensional cross-section view of a passive acoustic directional amplifier in accordance with the present description.

FIG. 2 illustrates a 2-dimensional cross-section view of an acoustic amplifier 200, concave structure 200, or passive acoustic directional amplifier 200 that can be used in conjunction with one or more microphones, sensors and/or transducers as described herein. It is understood that microphones, sensors and transducers include, but are not limited to, MEMS microphones, electret microphones, condenser microphones, and ultrasonic sensors. Passive acoustic directional amplifier 200 can be used in conjunction with many audio systems or devices in accordance with various embodiments described hereinafter. A cross-sectional view of passive acoustic directional amplifier 200 is used to represent a 3-dimensional object once rotated around axis 220 to create a cup-like 3-dimensional structure 210. Passive acoustic directional amplifier 200 comprises a concave inner structure 230 or inner shell 230 and an outer structure 240 or outer shell 240. Outer structure 240 may comprise a material in direct contact or indirect contact (via an intermediate material or structure) with at least a portion of the exterior surface of inner shell 230. Outer structure 240 can be coupled directly or indirectly to inner shell 230. Outer structure 240 may comprise a first material having a first sound absorption coefficient and inner shell 230 may comprise a second material having a second sound absorption coefficient. In some examples, the sound absorption coefficient of outer structure 240 is greater than the sound absorption coefficient of inner shell 230. In other examples, the sound absorption coefficient of outer structure 240 is less than the sound absorption coefficient of inner shell 230. In one example, outer structure 240 may comprise Acrylonitrile Butadiene Styrene (ABS) plastic with an approximate thickness of 0.7 millimeter, and inner shell 230 may comprise platinum-catalyzed soft silicone rubber with a Shore-A hardness of 8 and with an approximate thickness of 3 millimeters.

According to some examples, outer structure 240 comprises a material having a sound absorption coefficient less than about 0.3 for sound at a frequency of 2,000 Hz that is generally directed at a 0-degree angle with respect to a normal line of the surface of the material. According to some examples, inner shell 230 comprises a material having a sound absorption coefficient greater than about 0.25 for sound at a frequency of 2000 Hz that is generally directed at a 0-degree angle with respect to a normal line of the surface of the material. In one embodiment, inner shell 230 may comprise silicone or rubber silicone.

Inner shell 230 includes an interior curve 250 or interior surface 250. In some examples, interior surface 250 may be a spline curve where control points 252 and 254 are anchor points and control point 256 is equal distant from control points 252 and 254. In some examples, the distance between control point 256 and anchor point 252 is equal to the distance of separation between points 252 and 254 multiplied by about 3.4. In one embodiment for a passive acoustic directional amplifier 200, the distance between anchor control points 252 and 254 is 38 millimeters and control point 256 is 129.4 millimeters equal distant from anchor control points 252 and 254, which results in a spline curve 250 that extends 64 millimeters at a maximum distant point 258 from a midpoint 260 of anchor control points 252 and 254. In another embodiment, for a passive acoustic directional amplifier 200, the distance between anchor control points 252 and 254 is 19.6 millimeters and control point 256 is 107 millimeters equal distant from anchor control points 252 and 254, which results in a spline curve 250 that extends 53.3 millimeters at a maximum distant point 258 from a midpoint 260 of anchor control points 252 and 254.

According to various embodiments, passive acoustic directional amplifier 200 also comprises a sensor 262, microphone 262 or transducer 262, such as an ultrasonic sensor, an electret microphone, a condenser microphone, or a MEMS microphone. In some examples, an open port of MEMS microphone 262 can be located at a point within 4 millimeters from the maximum distant point 258 within interior surface 250 of passive acoustic directional amplifier 200. In other examples, an open port of MEMS microphone 262 can be located within 8 millimeters from the maximum distant point 258.

In accordance with the present description, outer structure 240 can comprise a material that may assist in preventing, via reflection, off-axis sound energy from reaching a transducer 262 or MEMS microphone 262 which is located within the cavity of passive acoustic directional amplifier 200. Since most sound reflective materials tend to be hard, rigid, and/or inelastic, outer structure 240 may further provide physical protection and physical support for passive acoustic directional amplifier 200 and any devices integrated therein. For example, a transducer 262 positioned within the cavity of passive acoustic directional amplifier 200 may benefit from physical protection provided by outer structure 240.

Furthermore, inner shell 230 may comprise a material that may assist in preventing sound energy which is transmitted by outer structure 240 from reaching transducer 262. In this way, inner shell 230 can act as a sound buffer/barrier between outer structure 240 and transducer 262. Without a sound buffer between outer structure 240 and transducer 240, contact noise can be transmitted to transducer 262 via physical contact or handling of passive acoustic direction amplifier 200, especially when passive acoustic directional amplifier is used as a hand-held or body-worn device. Handling and contact noise can be especially problematic when dealing with sound reflective materials which tend to be good sound reflectors and sound transmitters, as opposed to sound absorbers and sound dissipaters. By implementing both an outer structure 240, and an inner shell 230, an embodiment of passive acoustic amplifier 200 may enjoy benefits of physical protection provided by outer structure 240, attenuation of off-axis sound energy provided by outer structure 240 and inner shell 230, and a reduction in handling/contact noise reaching transducer 262 provided by inner shell 230, all while maintaining the advantages of passive directional amplification as described herein.

For example, in some embodiments, passive acoustic directional amplifier 200 can function to compress air-conduction acoustic waves to yield an approximate 10 dB of directional gain from sound sources emanating from a location in front of passive acoustic directional amplifier 100 and within about 15° of axis 220. The cup-like shape of interior surface 250 or interior curve 250 can be formed by rotation of interior curve 250 about axis 220 and represents a generally concave interior surface relative to microphone 262 rather than a convex interior surface. A convex surface, like that of a horn, would also tend to reflect and scatter sound. The shape and material composition of interior surface 250 will determine the compression efficiency and directional gain for a passive acoustic directional amplifier 200. There are many designs for interior curve 250 including different shapes, curves and/or piecewise segments which may be combined to yield various degrees of compression efficiency and directional gain. The amplification achieved by passive acoustic directional amplifier 200 is due, in part, to the collapsing volume within the cup-like 3-dimensional structure 210 along axis 220. The shape, texture, and the absorption and reflectivity attributes of the material composition of interior surface 250 also play a role in the amplification and directional sensitivity of passive acoustic directional amplifier 200.

In some examples, 3-dimensional structure 210 may have a circular shape corresponding to the rotation of the cross-section 210 along axis 220. In other examples, it may possess an elliptical shape, rectangular shape, triangular shape, pentagonal shape, or any other shapes which may result in net sound wave compression. According to various embodiments, different transducer types, such as a condenser microphone, an ultrasonic sensor, a dynamic microphone, or an electret microphone may be used and still achieve the objectives of passive acoustic directional amplifier 200 for microphones, audio systems and/or devices.

According to various embodiments, in addition to a transducer, other electrical elements and/or components may also be enclosed within the interior surface 250 of the 3-dimensional structure 210 of the passive acoustic directional amplifier 200. According to some examples, a circuit board to which a transducer is mounted, a processor, wiring, cabling, a battery, electrical connectors, intermediate structures, materials, attachment mechanisms and so forth may all be enclosed within the cavity formed by interior surface 250 and passive acoustic directional amplifier 200 can still achieve amplification and other effects of passive acoustic directional amplifier 200.

According to some embodiments, passive acoustic directional amplifier 200 may also comprise one or more sub-structures, supports, skeletons, slots, holes and/or components. For example, passive acoustic directional amplifier 200 may comprise structural elements to increase the stiffness of the deformable nature of a sound absorbing material. In some examples, the design for an exterior structure 240 or exterior surface 242 may include additional structures and/or components such as mounting hardware, shotgun microphone design features to achieve additional directionality, and/or parabolic reflector microphone design features to achieve additional gain and directionality benefits.

Figure 21:
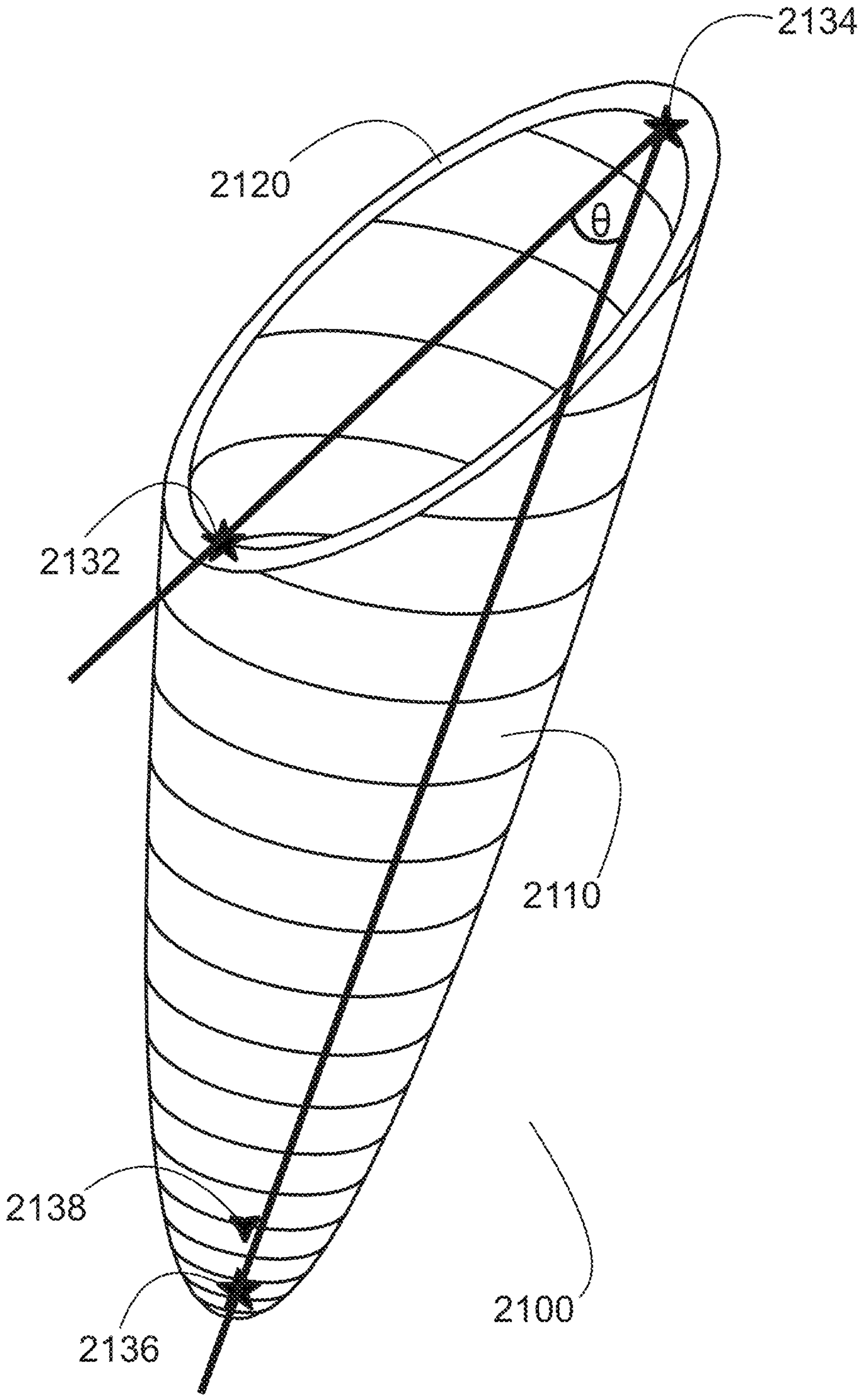
FIG. 21 illustrates a perspective view of a passive acoustic directional amplifier in accordance with the present description.

According to various embodiments, axis 220 may not be linear and may have a bending structure and still achieve amplification and other effects of a passive acoustic directional amplifier 200. In some embodiments, an opening to passive acoustic directional amplifier 200 may not be perpendicular to axis 220 and may be configured at an angle with respect to axis 220 such that control point 254 is further from control point 256 than control point 252 is from control point 256. FIG. 21 illustrates such an embodiment.

Figure 3:
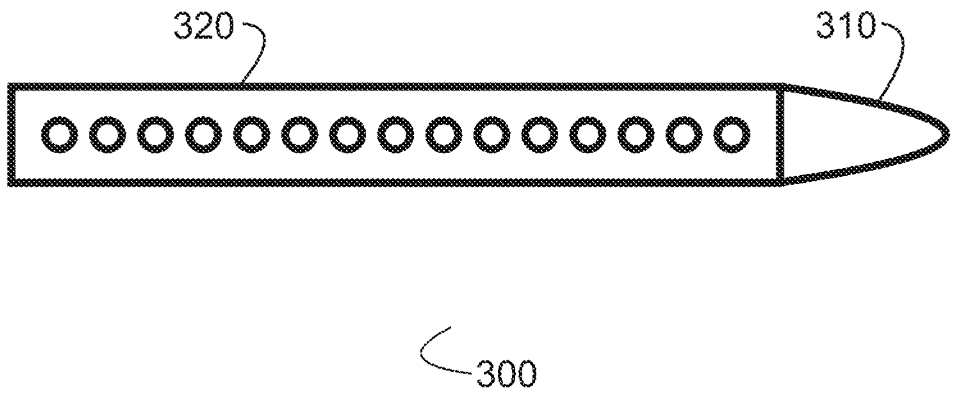
FIG. 3 illustrates a passive acoustic directional amplifier with an interference tube in accordance with the present description.

FIG. 3 illustrates a shotgun amplifier 300, or interference tube amplifier 300, that can be used in conjunction with one or more microphones, sensors and/or transducers as described herein. It is understood that microphones, sensors and transducers include, but are not limited to, MEMS microphones, electret microphones, condenser microphones, and ultrasonic sensors. Interference tube amplifier 300 can be used in conjunction with many audio systems or devices in accordance with various embodiments described herein. Interference tube amplifier 300 can comprise an interference tube 320 coupled directly or indirectly to a passive acoustic directional amplifier 310. Interference tube 320 comprises a plurality of holes or slots along the length of the tube. The holes or slots of the interference tube are configured to cause the sound level of off-axis sound which enters the tube to be greatly reduced. This dampening of off-axis sound occurs, in part, as a result of phase cancellation within the interference tube. According to some examples, passive acoustic directional amplifier 310 may be passive acoustic directional amplifier 100 as described in relation to in FIGS. 1A-C, passive acoustic directional amplifier 200 in FIG. 2, or any other passive acoustic directional amplifier as described or enabled herein. In some examples, passive acoustic directional amplifier 310 comprises a MEMS microphone located within the cavity of passive acoustic directional amplifier 310. In some examples, the MEMS microphone can be located at or near the bottom or vertex of the cavity of passive acoustic directional amplifier 310. Interference tube 320 can enable passive acoustic directional amplifier 310 to further discriminate between on-axis and off-axis sound waves.

Figure 4:
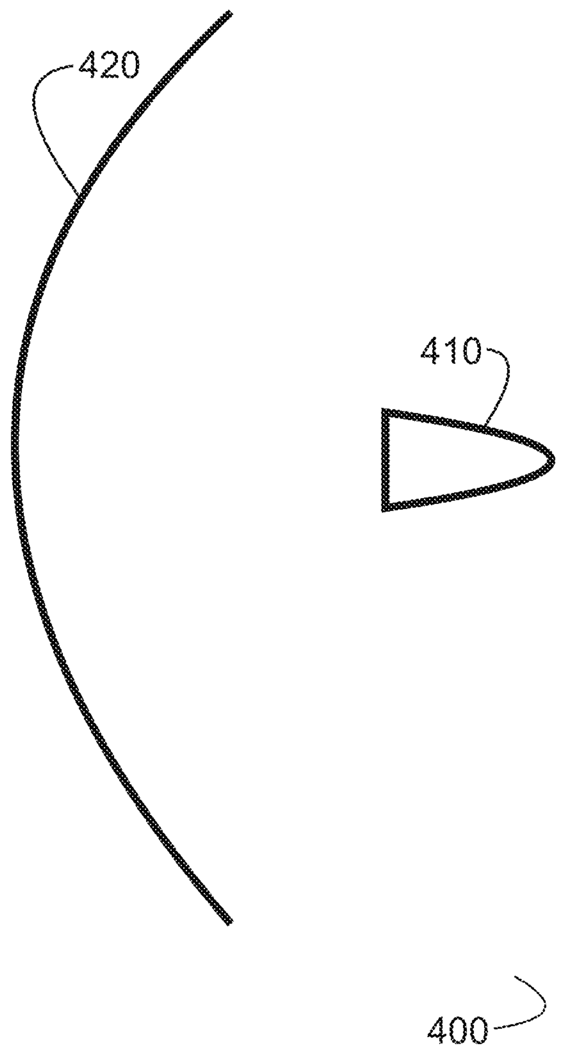
FIG. 4 illustrates a passive acoustic directional amplifier with a parabolic dish in accordance with the present description.

FIG. 4 illustrates a parabolic reflector system 400 that can be used in conjunction with one or more microphones, sensors, and/or transducers as described herein. Parabolic reflector system 400 can be used in conjunction with many audio systems or devices in accordance with various embodiments described herein. A parabolic reflector 420 can be positioned in front of a passive acoustic directional amplifier 410. In some examples, passive acoustic directional amplifier 410 may be passive acoustic directional amplifier 100 as described in relation to FIG. 1A-C, passive acoustic directional amplifier 200 in FIG. 2, or any other passive acoustic directional amplifier as described or enabled herein. In some examples, passive acoustic directional amplifier 410 comprises a MEMS microphone located within the cavity of passive acoustic directional amplifier 410. In some examples, the MEMS microphone can be located at or near the bottom, or vertex, of the cavity of passive acoustic directional amplifier 410.

In a preferred embodiment, passive acoustic directional amplifier 410 can be placed at a location at or near the focal point of parabolic reflector 420. Parabolic reflector 420 can be used to focus sound waves toward and into passive acoustic directional amplifier 410. Parabolic reflector 420 can increase sensitivity to sounds in a direction, along the axis of the dish, and can pick up distant sounds.

Figure 5:
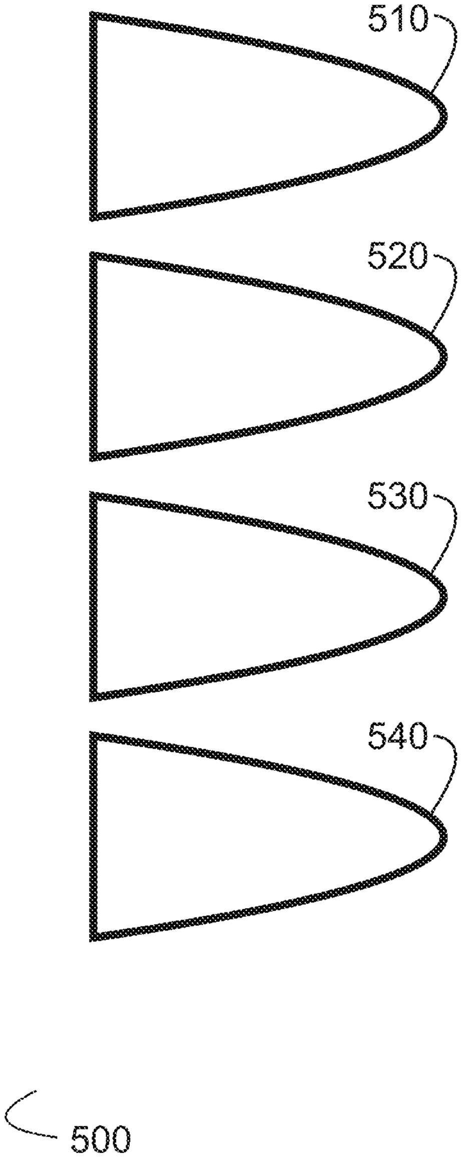
FIG. 5 illustrates multiple passive acoustic directional amplifiers in accordance with the present description.

FIG. 5 illustrates a passive acoustic directional amplifier system 500 that can be used in conjunction with a plurality of microphones, sensors, and/or transducers as described herein. A plurality of passive acoustic directional amplifiers can be pointed in the direction of a sound source. According to some examples, four passive acoustic directional amplifiers, 510, 520, 530, and 540, can be pointed in the direction of a sound source. Passive acoustic directional amplifiers 510, 520, 530, and 540 can be passive acoustic directional amplifiers such as 100 in FIGS. 1A-C, passive acoustic directional amplifiers 200 in FIG. 2, or any other passive acoustic directional amplifiers as described or enabled herein. In some examples, each of passive acoustic directional amplifiers 510, 520, 530, and 540 comprise a MEMS microphone located within their cavity. For example, a MEMS microphone can be located at or near the bottom of the cavity of each of passive acoustic directional amplifier 510, 520, 530, and 540. The microphone signals from each of the four passive acoustic directional amplifiers 510, 520, 530, and 540 can be added together to effectively reduce the EIN of the resulting signal. According to one embodiment, the effective EIN of the resulting signal may be reduced by at least an additional 6 dB if the microphones are closely matched, as compared to the signal from a single passive acoustic directional amplifier such as 510. The signals from microphones in two or more passive acoustic directional amplifiers may be added together to effectively reduce the EIN of the resulting signal when pointed in the direction of a sound source.

Figure 6:
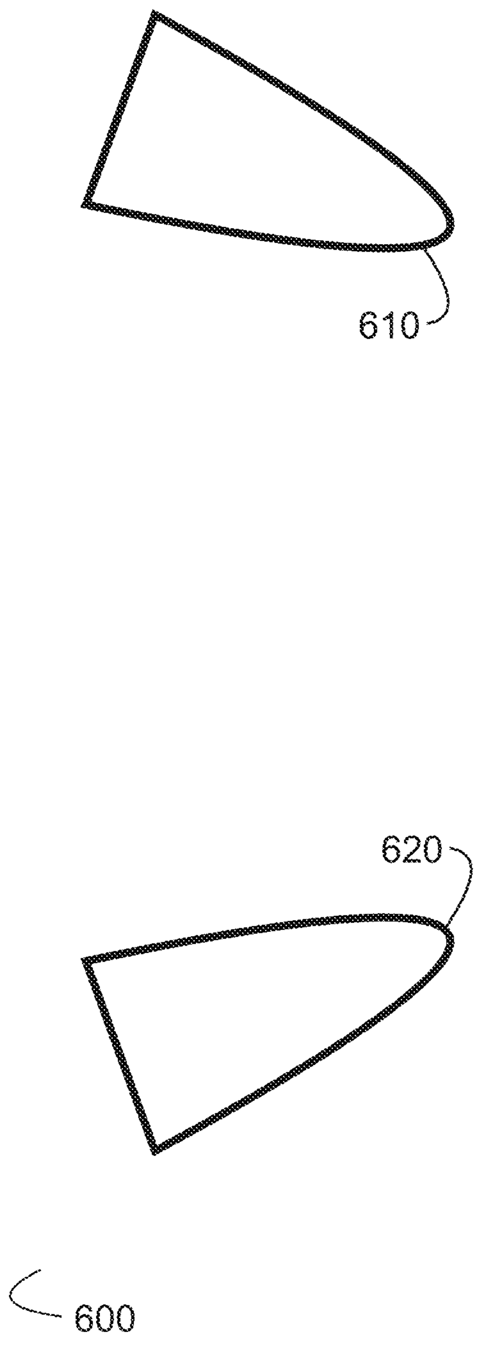
FIG. 6 illustrates multiple passive acoustic directional amplifiers in accordance with the present description.

FIG. 6 illustrates a passive acoustic directional amplifier system 600 that can be used in conjunction with a plurality of microphones, sensors, and/or transducers as described herein. Two passive acoustic directional amplifiers, 610 and 620, can be positioned and oriented to detect and/or record stereo sound. Passive acoustic directional amplifiers 610 and 620 may be passive acoustic directional amplifiers such as 100 in FIGS. 1A-C, passive acoustic directional amplifiers 200 in FIG. 2, or any other passive acoustic directional amplifiers as described or enabled herein. In some examples, each of passive acoustic directional amplifiers 610 and 620 can comprise a MEMS microphone located within their cavity. For example, a MEMS microphones can be located at or near the bottom of the cavity of each of passive acoustic directional amplifier 610 and 620. In some examples, passive acoustic directional amplifiers 610 and 620 can be configured according to the ORTF, NOS, or other stereo microphone systems as known by one of ordinary skill in the art. The use of passive acoustic directional amplifiers 610 and 620 to record stereo can have various advantages, including, but not limited to, high SNR, low effective EIN, compact size, light weight, parametrically defined directionality and frequency dependent polar sensitivity, closely matched microphone sensitivities for multiple microphone applications, suppression of background sounds, and low cost.

In some examples, each of passive acoustic directional amplifiers 610 and 620 can comprise an ultrasonic sensor located at or near the bottom of the cavity of each of passive acoustic directional amplifier 610 and 620. In this embodiment, passive acoustic directional amplifier system 600 can be configured to provide useful metadata information such as acoustic location data where sound is used to determine the distance and/or direction of a sound source or sound reflector. The derivation of such acoustic location metadata can be done actively or passively with passive acoustic directional amplifier system 600. Active acoustic location metadata can involve the creation of sound in order to produce an echo, which can then be analyzed with time-of-flight data and triangulation to determine the location, proximity, or distance of the object. Passive acoustic location metadata can involve the detection of sound or vibration created or reflected by the object being detected. The metadata can be analyzed to determine the location, proximity, or distance of the object. Metadata can include, for example, differential amplitude data or time difference of arrival data generated when using passive acoustic directional amplifier system 600.

Figure 7:
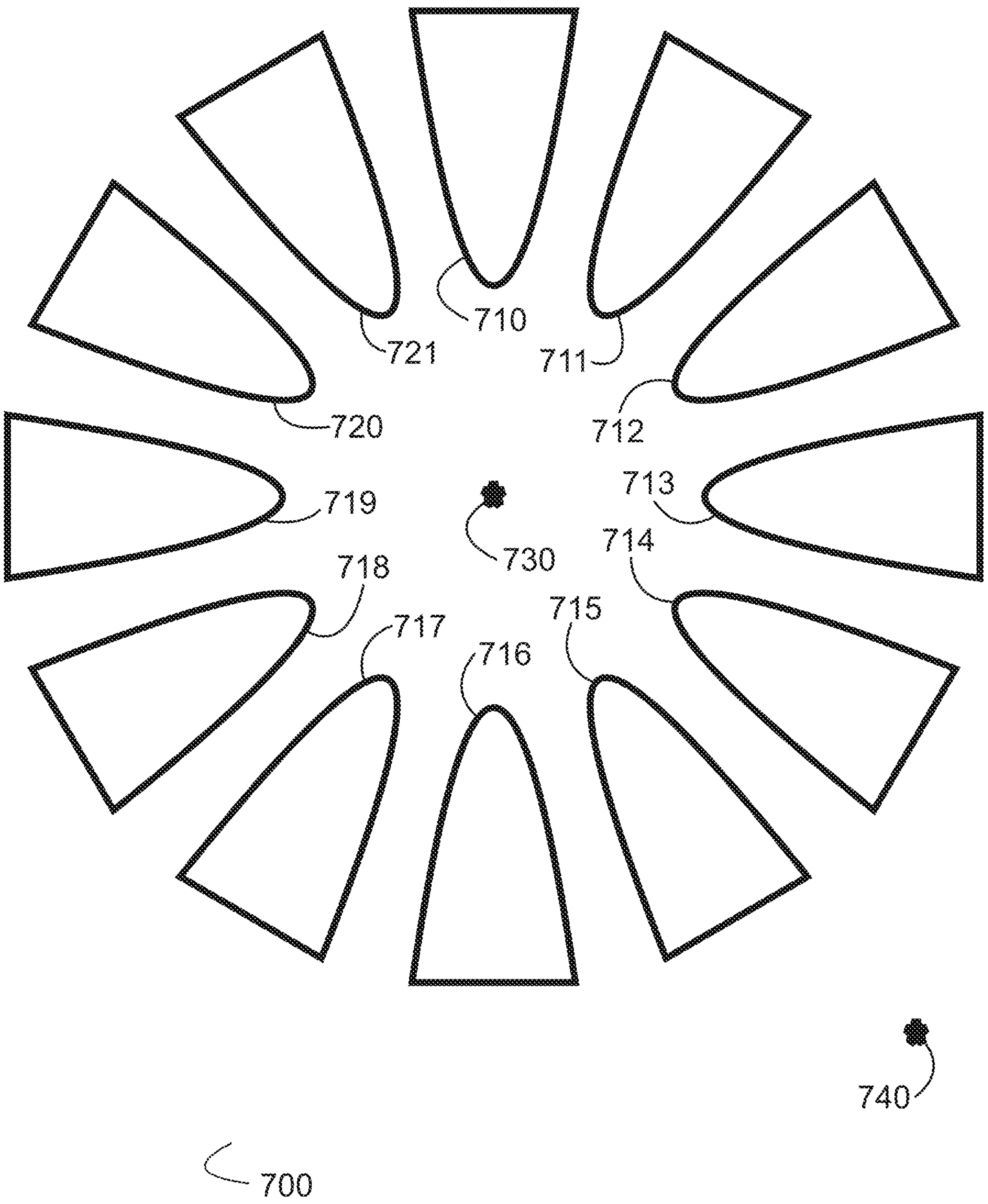
FIG. 7 illustrates an array of passive acoustic directional amplifiers in accordance with the present description.

FIG. 7 illustrates a passive acoustic directional amplifier array 700 that can be used in conjunction with a plurality of microphones, sensors, and/or transducers as described herein. Passive acoustic directional amplifier array 700 can enable various systems and applications, such as smart speakers, voice activated devices, vehicle infotainment systems, surveillance systems, audio conferencing systems, audio VR, or spatial location, detection, and discrimination of one or more objects. According to one embodiment, passive acoustic directional amplifier array 700 can comprise twelve passive acoustic directional amplifiers: 710, 711, 712, 713, 714, 715, 716, 717, 718, 719, 720, and 721, which can be positioned and oriented to detect and record VR sound in the azimuthal plane. According to an embodiment, passive acoustic directional amplifiers 710-721 can be passive acoustic directional amplifiers such as 100 in FIG. 1, passive acoustic directional amplifiers such as 200 in FIG. 2, or any other passive acoustic directional amplifier described or enabled herein. According to one embodiment, passive acoustic directional amplifiers 710-721 can be oriented in a planar 30° radial pattern arrangement to allow for 12-channel sound recording.

According to an embodiment for a VR system, 12 speakers could be placed at 30° intervals around a listener and driven individually to reproduce the 12-channel recording and achieve a VR "surround sound" experience. In some examples, more or fewer microphones and/or speakers could be used to recreate a similar VR experience. According to an embodiment, the twelve passive acoustic directional amplifiers 710-721 can be configured within a space and model for dummy head recording where a dummy's "fixed in space" perspective 730 can be represented by a centroid of array 700. Each channel of the 12-channel sound recording can be calibrated with an acoustic signal positioned at a position such as position 740 relative to the dummy's "fixed in space" perspective 730. Additionally, the 12-channel sound recording can be calibrated with an acoustic signal positioned at a multiplicity of positions relative to the dummy's "fixed in space" perspective 730 to achieve MAA resolution for azimuth and distance. For example, each channel of the 12-channel sound recording can be calibrated with a multiplicity of acoustic signals such as a multiplicity of $\frac{1}{6}^{th}$ octave parametrically formulated noise acoustic signals positioned at a multiplicity of positions relative to the dummy's "fixed in space" perspective 730 to achieve MAA resolution for azimuth and distance for a multiplicity of frequency bands.

In some examples, each channel of the 12-channel sound recording can be added or mixed to provide a binaural listening experience through headphones to allow a listener to hear a recording from the dummy's "fixed in space" perspective. Each channel of the 12-channel sound recording may be added or mixed using calibration corrections to provide a binaural listening experience through headphones to allow a normal hearing listener to hear a recording with MAA resolution from the dummy's "fixed in space" perspective. Directional acoustic fitting techniques and head modeling may be used to derive a specific individual's HRTF and consequently each channel of the 12-channel sound recording may be added or mixed using calibration corrections and the specific individual's HRTF to provide a binaural listening experience through headphones to allow the specific individual to hear a recording with MAA resolution from the dummy's "fixed in space" perspective. In a further example, an azimuth sensor for an individual's head orientation may be used to modify adding and mixing of each channel of the 12-channel sound recording to create an azimuthal VR binaural listening experience through headphones from the dummy's "fixed in space" perspective. In another example, other mechanisms, such as a rotatable knob, a joystick, or coordination with visual VR imagery may be used to modify adding and mixing of each channel of the 12-channel sound recording to create an azimuthal VR binaural listening experience through headphones from the dummy's "fixed in space" perspective. It is noted that there are a multiplicity of ways to simplify the storage, adding, and mixing for each channel of the 12 channel sound recording such as: determining the loudest azimuthal MAA direction for each critical frequency band based on the loudest sound channel recording, the next loudest sound channel recording, and directional interpolation using calibration data; the generation of metadata to describe sound source azimuthal directions for each critical frequency band based on perspective 730; the interpolation of the metadata for each critical frequency band using HRTF for head shadow and interaural timing differences for sound localization and the Stenger principle for auditory masking; and, creating an azimuthal VR binaural listening experience through headphones for the dummy's "fixed in space" perspective.

In accordance with the present description, three or more passive acoustic directional amplifiers with corresponding channel sound recordings may be positioned and oriented to record VR sound in the azimuthal plane and then used to create an azimuthal VR binaural listening experience through headphones for the dummy's "fixed in space" perspective.

In further examples, twelve passive acoustic directional amplifiers 710-721 can be positioned and oriented to record VR sound in three dimensions. For example, passive acoustic directional amplifiers 710-721 can be oriented in a regular dodecahedron arrangement with the axis of each passive acoustic directional amplifier projecting outward perpendicularly from each dodecahedron face to allow 12-channel, three-dimensional sound recording.

In a further example, many audio systems, such as smart speakers, conferencing systems, surveillance systems and vehicles, can benefit from the implementation of an array of passive acoustic directional amplifiers such as passive acoustic directional amplifiers 710-721.

Figure 8:
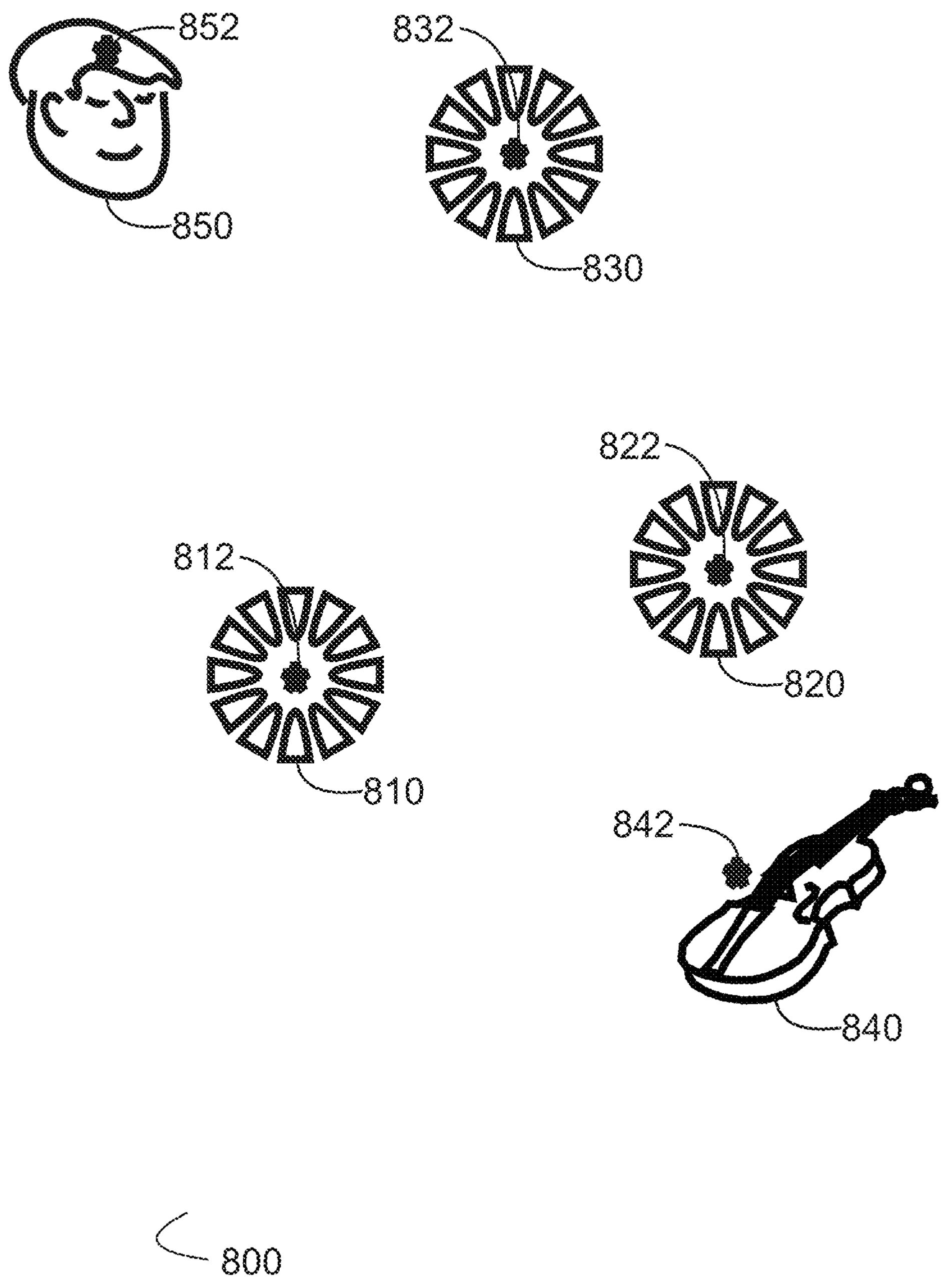
FIG. 8 illustrates a plurality of passive acoustic directional amplifier arrays in accordance with the present description.

FIG. 8 illustrates a network 800 of passive acoustic directional amplifier arrays such as arrays 810, 820, and 830 in accordance with the present description. Network 800 can be used in conjunction with one or more microphones, sensors and/or transducers as described hereinafter. Network 800 can be applied to audio systems and/or devices in order to enable acoustic VR or advanced spatial location, detection, and discrimination of multiple objects. In some examples, passive acoustic directional amplifier arrays 810, 820, and 830 can be passive acoustic directional amplifier arrays such as passive acoustic directional amplifier array 700 in FIG. 7. Each of passive acoustic directional amplifier arrays 810, 820, and 830 can have a corresponding "fixed in space" perspective such as perspectives 812, 822, and 832. A sound source 840 also has a perspective 842 relative to the perspectives 812, 822, and 832 of the arrays 810, 820, and 830 in the network 800. The physical location of perspective 842 of the sound source 840 can be determined by azimuth and elevation triangulation using metadata from the passive acoustic directional amplifier arrays of network 800. An individual 850 may have a physical or virtual perspective 852 relative to the perspectives 812, 822, and 832 of the passive acoustic directional amplifier arrays 810, 820, and 830 in the network 800. In some examples, perspective 852 for individual 850 can include both head orientation and position location relative to the passive acoustic directional amplifier arrays of network 800. A physical location or a virtual location of the individual 850 with perspective 852 relative to the passive acoustic directional amplifier arrays of network 800 can be determined or simulated in a multitude of ways. It is noted that a network 800 of passive acoustic directional amplifier arrays can provide benefits such as positional translation of individual 850 with perspective 852 in an acoustic VR system.

Figure 9:
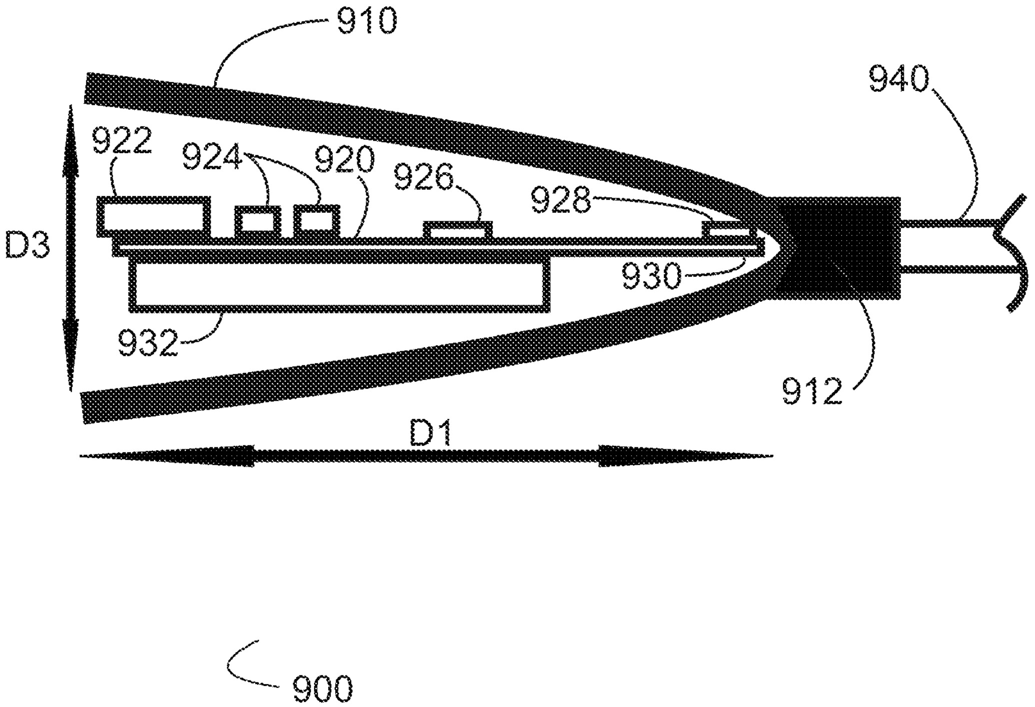
FIG. 9 illustrates a 2-dimensional cross-section view of a passive acoustic directional amplifier in accordance with the present description.

FIG. 9 illustrates a 2-dimensional cross-section view of an audio system 900 or audio device 900 in accordance with the present description. Audio device 900 includes a passive acoustic directional amplifier 910 or concave structure 910. Passive acoustic directional amplifier 910 may be configured as any passive acoustic directional amplifier which is described or enabled herein. For example, passive acoustic directional amplifier 910 can be passive acoustic directional amplifier 100 in FIGS. 1A-C, passive acoustic directional amplifier 200 in FIG. 2, or any other passive acoustic directional amplifier as described or enabled herein. In accordance with the present description, passive acoustic directional amplifier 910 can include a through-hole 912, feed-through port 912, or circuit board attachment point 912. In some examples, feed-through port 912 can allow one or more cables 940 or wires 940 to pass through between the interior cavity of passive acoustic directional amplifier 910 to audio components or devices which can be exterior to passive acoustic directional amplifier 910. For example, cable 940 can be coupled to headphones, a bone conduction transducer, a cochlear implant stimulator, or earbuds which are located external to passive acoustic directional amplifier 910. In other examples, cable 940 can be coupled to a battery, a signal processor, a transmitter, a transceiver, or another component that is located external to passive acoustic directional amplifier 910.

In one example, there may be no cable 940 and electronic components are contained solely within passive acoustic directional amplifier 910. According to some examples, attachment point 912 can act as a physical support for physical/electronic components contained within passive acoustic directional amplifier 910. According to some examples, attachment point 912 can be used to mechanically and electrically attach passive acoustic directional amplifier 910 to an exterior device or system.

In some examples, feed-through port 912 can form an acoustic seal around a cable 940. Furthermore, feed-through port 912 can provide strain relief for cable 940. In some examples, passive acoustic directional amplifier 910 and integrated feed-through 912 may be uniformly composed of a single material, for example, platinum-catalyzed soft silicone rubber with a Shore-A hardness of 8.

Passive acoustic directional amplifier 910 has a cavity depth D1 and in some examples can have a circular opening with a diameter D3. In one example cavity depth D1 can be about 53 millimeters and diameter D3 can be about 19 millimeters.

As shown, passive acoustic directional amplifier further comprises a support 920 or circuit board 920 positioned at least partially within the cavity of passive acoustic directional amplifier 910. Support 920 or circuit board 920 can have a microphone 928, MEMS microphone 928, sensor 928, or transducer 928 mounted thereon. In many examples, circuit board 920 can comprise additional components, such as one or more of the following components: a USB connector 922, one or more user input buttons 924, a signal processor 926, a transmitter, such as a Bluetooth transmitter, and/or a battery 932, such as a lithium-ion polymer battery. Each component can be mounted, coupled or electrically connected to circuit board 920. Cable 940 is electrically coupled, directly or indirectly, to circuit board 920. In one example, cable 940 is mechanically attached to circuit board 920 so as to retain and position circuit board 920 within the cavity of passive acoustic directional amplifier 910. It is not a requirement that circuit board 920 comprise all of the above-described components, and according to various embodiments, circuit board 920 may include other electronic components in addition to the above-described components, in particular, those components which are necessary for the operation of any of the above-described components.

In some examples, signal processor 926 can be a digital signal processor. Alternatively, signal processor 926 may be an analog signal processor. In some examples, signal processor 926 may comprise a transmitter configured to transmit an audio signal wirelessly. In some examples, the audio signal can be transmitted to wireless earbuds, to a wireless headset, or to another device capable of receiving a wireless signal. In some examples, signal processor 926 can be located within the cavity of passive acoustic directional amplifier 910. In other examples, signal processor 926 can be located external to the cavity of passive acoustic directional amplifier 910. Signal processor 926 can be electrically coupled, directly or indirectly, to MEMS microphone 928.

In some examples, one or more through-holes 912 can be configured as a conductive vias, conductive pins, through hole pins, plated through holes, conductive interconnects or the like and can provide electrical connection to/from external components and internal components within the cavity of passive acoustic directional amplifier 910. In accordance with such examples, electrical connection can be made directly through passive acoustic directional amplifier 910 while still allowing passive acoustic directional amplifier 910 to generally form and maintain an acoustic seal.

In some examples, cable 940 can be a COM cable providing terminal data such as sound level information from the microphone 928 via the signal processor 926. In some examples, cable 940 can provide an audio signal from the microphone 928 via the signal processor 926 as well as provide power to the circuit board 920 and other electronics attached thereon. In some examples, cable 940 can be used to transfer an acoustic signal to a bone conduction speaker or other speaker type. In yet other examples, cable 940 can be used to transfer ultrasound acoustic location metadata.

In examples where a MEMS microphone is used, a bottom port 930 of MEMS microphone 928 can be positioned at or near the bottom of the cavity of a passive acoustic directional amplifier 910.

Figure 10A:
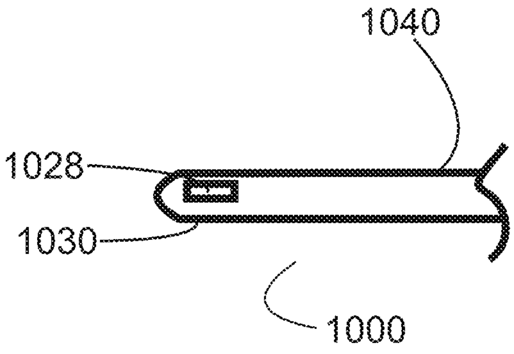
FIG. 10A illustrates an audio device in accordance with the present description.

FIG. 10A illustrates an audio device 1000 comprising a transducer 1028, microphone 1028, MEMS microphone 1028, or sensor 1028 mounted or coupled to a substrate 1040, sleeve 1040, circuit board 1040, connector 1040, cable 1040, or holding mount 1040. In some examples, such as a MEMS microphone embodiment, transducer 1028 can include a sound port opening 1030.

Figure 10B:
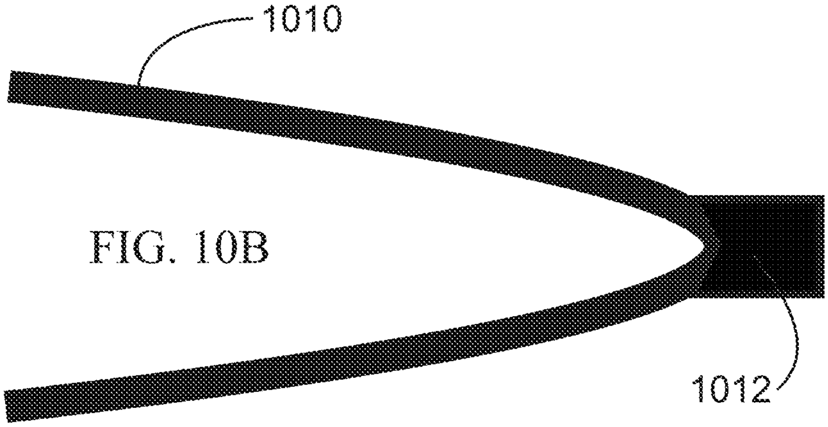
FIG. 10B illustrates a 2-dimensional cross-section view of a passive acoustic directional amplifier in accordance with the present description.

FIG. 10B illustrates a 2-dimensional cross-section view of a passive acoustic directional amplifier 1010 in accordance with the present description. Passive acoustic directional amplifier 1010 can be configured as any passive acoustic directional amplifier which is described or enabled herein. For example, passive acoustic directional amplifier 910 can be passive acoustic directional amplifier 100 in FIGS. 1A-C, passive acoustic directional amplifier 200 in FIG. 2, passive acoustic directional amplifier 300 in FIG. 3, or any other passive acoustic directional amplifier as described or enabled herein. In accordance with the present description, passive acoustic directional amplifier 1010 can include a through-hole 1012 or feed-through port 1012. In some examples, feed-through port 1012 can allow at least a portion of audio device 1000 with transducer 1028 to enter the cavity formed by passive acoustic directional amplifier 1010 as shown in FIG. 10C.

Figure 10C:
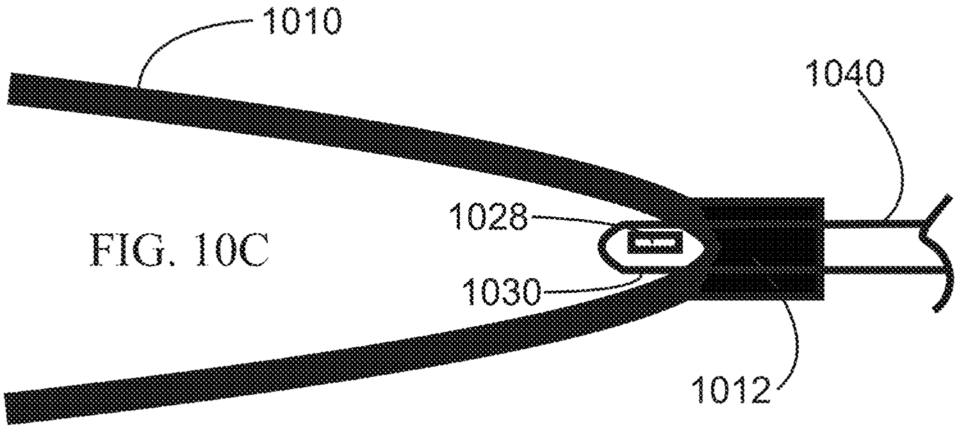
FIG. 10C illustrates a 2-dimensional cross-section view of a passive acoustic directional amplifier in accordance with the present description.

FIG. 10C illustrates a 2-dimensional cross-section view of a passive acoustic directional amplifier 1010. Passive acoustic directional amplifier 1010 includes a through-hole 1012 or feed-through port 1012. Passive acoustic directional amplifier also includes audio device 1000 (FIG. 10A) comprising a transducer 1028, microphone 1028, MEMS microphone 1028, or sensor 1028 mounted or coupled to a substrate 1040, sleeve 1040, circuit board 1040, or holding mount 1040. In some examples, feed-through hole 1012 can form an acoustic seal about substrate 1040. In another example, feed-through hole 1012 can form an acoustic seal about one or more wires or cables 1040 coupled to transducer 1028. Such cables can pass through or between the interior cavity of passive acoustic directional amplifier 1010 to audio components or devices which can be exterior to passive acoustic directional amplifier 1010. For example, a cable 1040 can be coupled to a hearing aid, headphones, a bone conduction transducer, a cochlear implant stimulator, or earbuds which are located external to passive acoustic directional amplifier 1010. In other examples, a cable 1040 can be coupled to a battery, a signal processor, a transmitter, and/or another component that is located external to passive acoustic directional amplifier 1010.

In some examples, passive acoustic directional amplifier 1010 and integrated feed-through 1012 may be uniformly composed of a single material, for example, platinum-catalyzed soft silicone rubber a Shore-A hardness of 8. In some examples, one or more through-holes 1012 can be configured as conductive vias, conductive pins, through hole pins, plated through holes, conductive interconnects or the like and can provide electrical connection to/from external components and internal components within the cavity of passive acoustic directional amplifier 1010. In accordance with such examples, electrical connection can be made directly through passive acoustic directional amplifier 1010 while still allowing passive acoustic directional amplifier 1010 to generally form and maintain an acoustic seal.

In many examples transducer 1028 is positioned at or near the bottom of the cavity formed by passive acoustic directional amplifier 1010. In a preferred embodiment, a sound port opening 1030 of transducer 1028 is positioned within 4 millimeters of the bottom of the cavity formed by passive acoustic directional amplifier 1010.

In one embodiment of the present description, substrate 1040 is configured as an electrical connector through which external devices can be connected or disconnected to transducer 1028. In one example, a hearing aid may be configured with an auxiliary input. When the hearing aid is used in an auxiliary input mode, transducer 1028, along with passive acoustic directional amplifier 1010, can act as a microphone for the hearing aid via connector 1040 which can be coupled to the auxiliary input of the hearing aid. In this configuration, the hearing aid would benefit from, among other things, improved SNR and improved effective microphone EIN.

Figure 11:
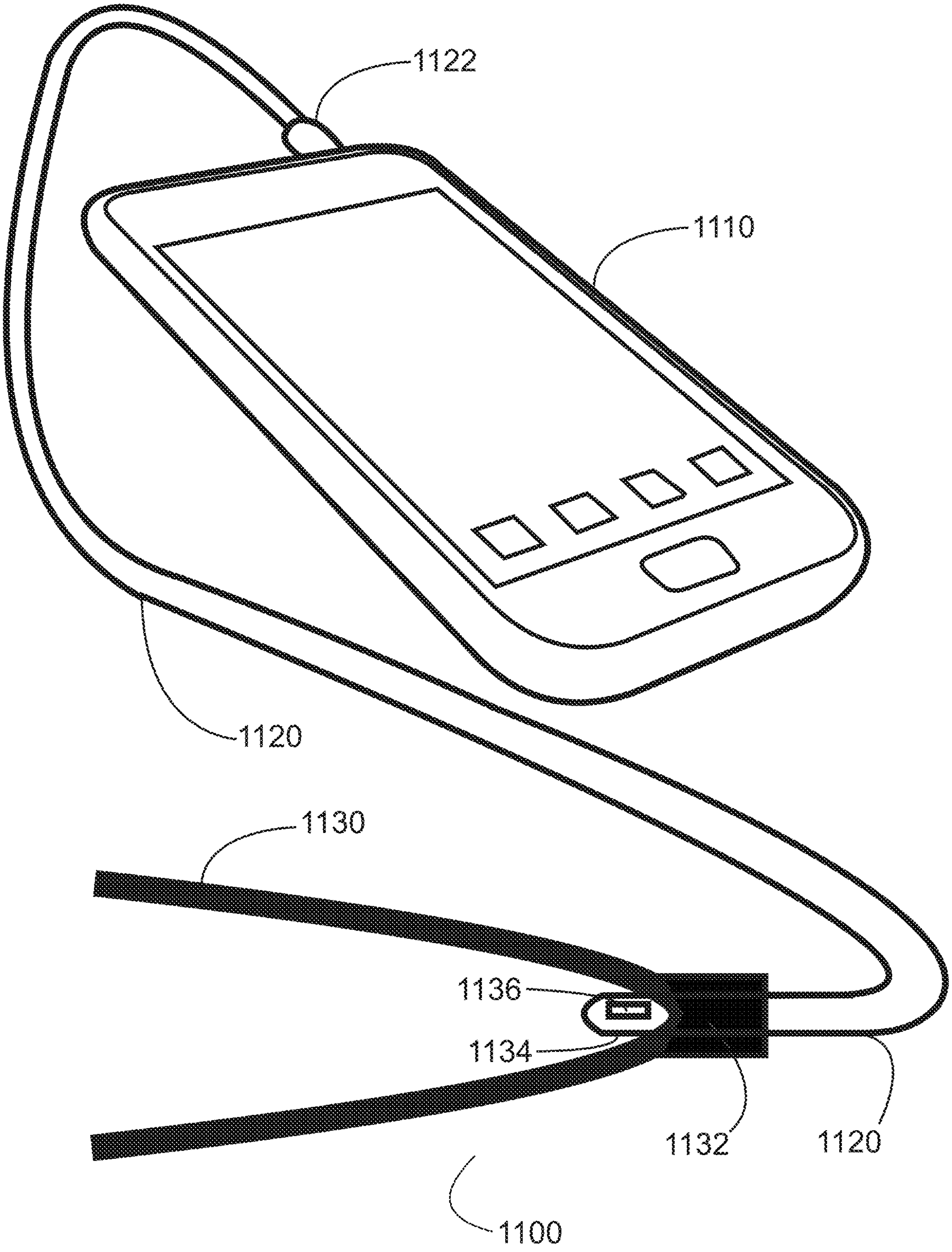
FIG. 11 illustrates an audio system comprising a passive acoustic directional amplifier in accordance with the present description.

FIG. 11 illustrates an audio system 1100 in accordance with the present description. Audio system 1100 comprises a passive acoustic directional amplifier 1130 shown in 2-dimensional cross-section view. Passive acoustic directional amplifier 1130 may be configured as any passive acoustic directional amplifier which is described or enabled herein. For example, passive acoustic directional amplifier 1130 can be passive acoustic directional amplifier 100 in FIGS. 1A-C, passive acoustic directional amplifier 200 in FIG. 2, shotgun amplifier 300 in FIG. 3, passive acoustic directional amplifier 1010 in FIG. 10C or any other passive acoustic directional amplifier as described or enabled herein. Passive acoustic directional amplifier 1130 includes a through-hole 1132, connector 1132, or feed-through port 1132. Passive acoustic directional amplifier 1130 also includes audio device 1134 comprising a transducer 1136, microphone 1136, electret microphone 1136, or sensor 1136 mounted or coupled to a substrate 1120, sleeve 1120, circuit board 1120, holding mount 1120, connector 1120, cable 1120 or wire 1120. In some examples, feed-through hole 1132 can form an acoustic seal about substrate 1120. In another example, feed-through hole 1132 can form an acoustic seal about one or more wires 1120, cables 1120 coupled to transducer 1136. Cable 1120 can pass through or between the interior cavity of passive acoustic directional amplifier 1130 to an electronic device 1110, a cell phone 1110 or a portable electronic device 1110, which is exterior to passive acoustic directional amplifier 1130. For example, a cable 1120 can be coupled to a portable electronic device 1110 via an electrical connector 1122. In another example, a microphone 1136 can be connected via a cable 1120 and connector 1122 to a portable electronic device 1110 which can be running an application to transcribe speech to text. In this example, a passive acoustic directional amplifier 1130 can demonstrate an improved SII benefit of more than 50% for normal speech levels at 2 meters distance from a speaker's mouth to microphone as compared to a similar audio system without passive acoustic direction amplifier 1130. In another example, portable electronic device 1110 may be running an audio and/or video recording application and may benefit from increased SNR and decreased effective EIN.

Figure 12:
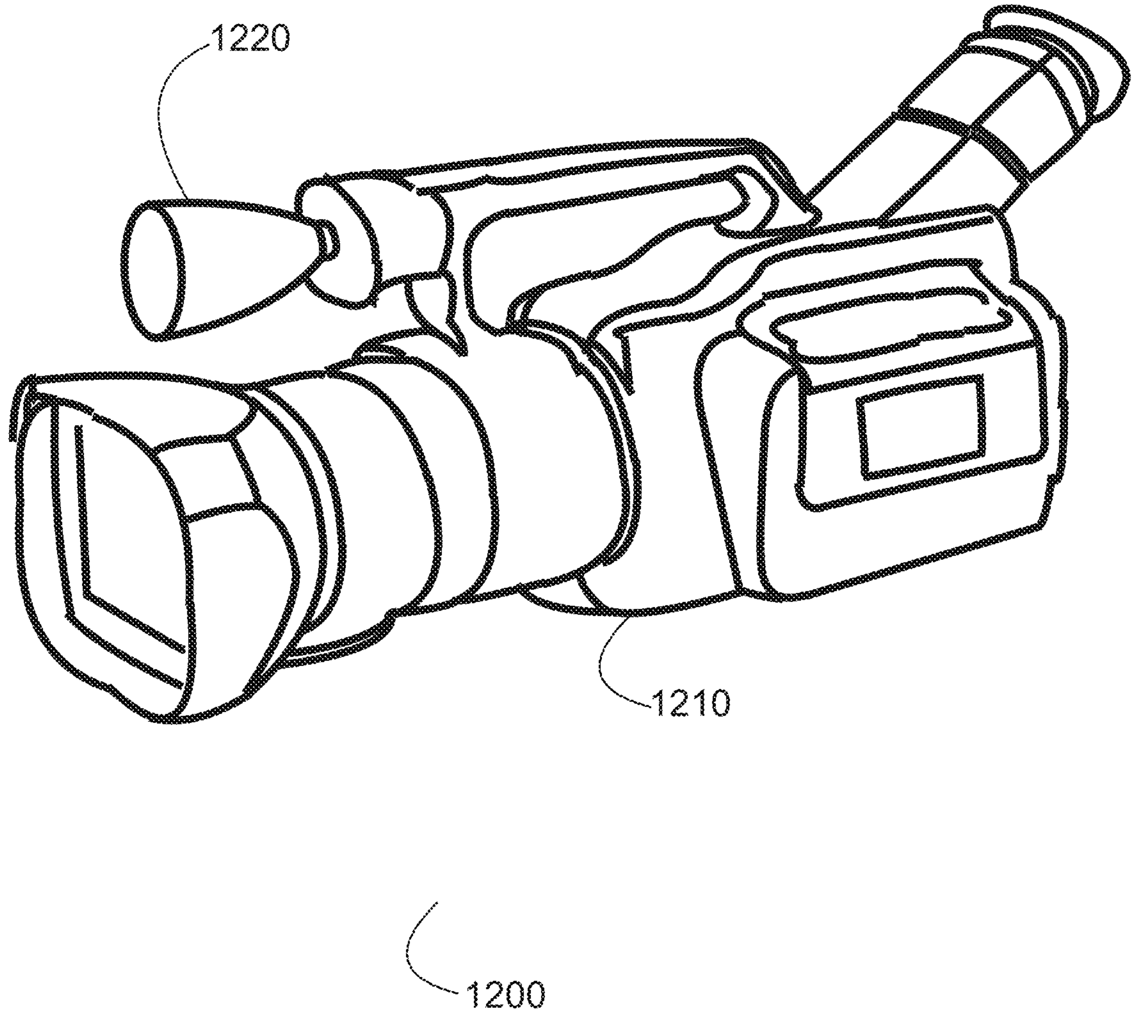
FIG. 12 illustrates an audio system comprising a passive acoustic directional amplifier in accordance with the present description.

FIG. 12 illustrates an audio system 1200 in accordance with the present description. Audio system 1200 comprises an electronic device 1210 or audio/video recorder 1210 and a passive acoustic directional amplifier 1220. Passive acoustic directional amplifier 1220 may be configured as any passive acoustic directional amplifier which is described or enabled herein. For example, passive acoustic directional amplifier 1220 can be passive acoustic directional amplifier 100 in FIGS. 1A-C, passive acoustic directional amplifier 200 in FIG. 2, shotgun amplifier 300 in FIG. 3, passive acoustic directional amplifier 1010 in FIG. 10B-C or any other passive acoustic directional amplifier as described or enabled herein. In some examples, passive acoustic directional amplifier 1220 is integral with the audio/video recording device 1210. In other examples, passive acoustic directional amplifier 1220 is mounted to audio/video recorder 1210 and is detachable and replaceable.

Figure 13:
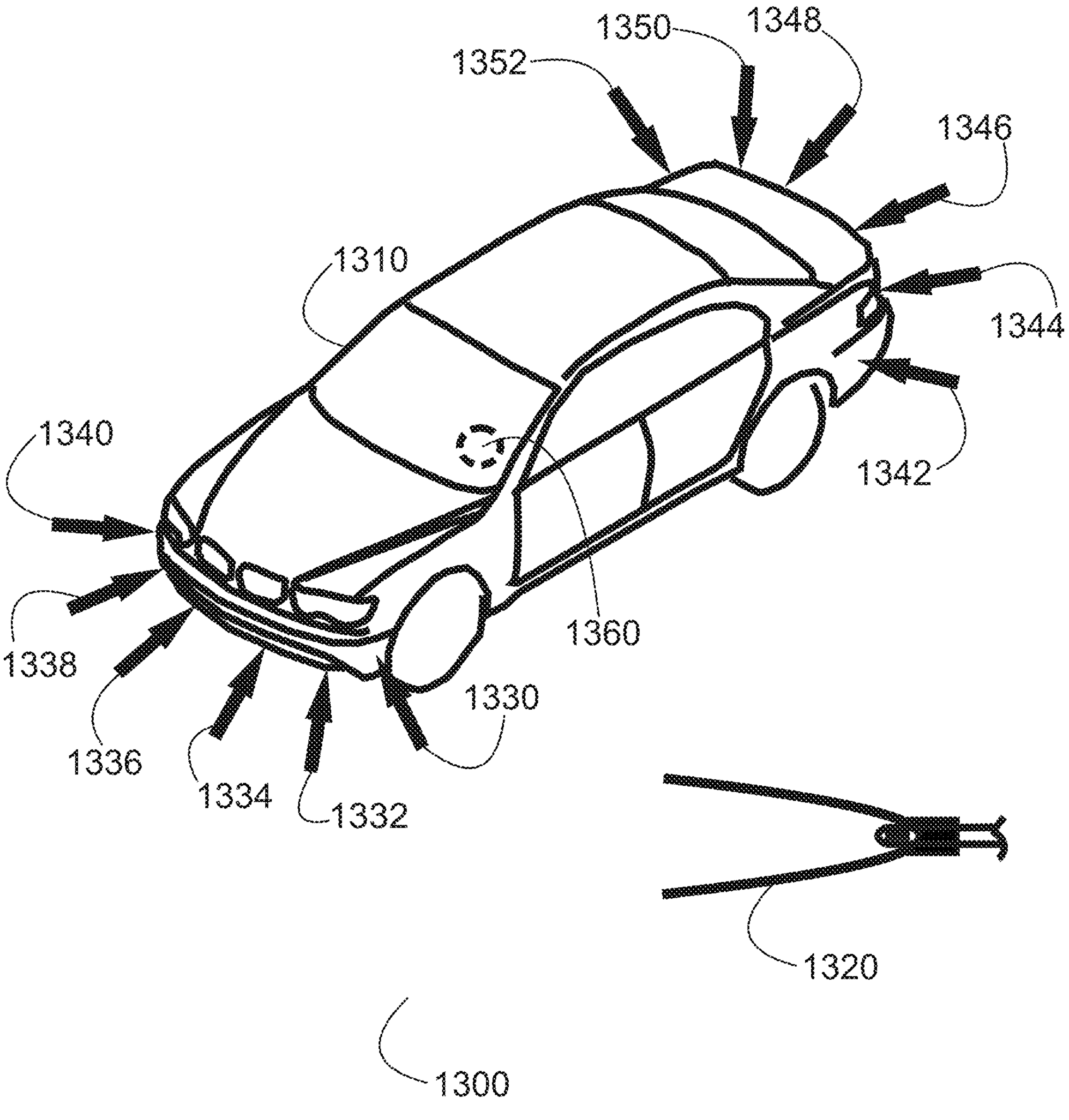
FIG. 13 illustrates an audio system comprising a passive acoustic directional amplifier in accordance with the present description.

FIG. 13 illustrates a audio system 1300 or sensor system 1300 in accordance with the present description. Audio system 1300 comprises one or more passive acoustic directional amplifiers such as passive acoustic directional amplifier 1320 (shown schematically) that can be used in conjunction with microphones, ultrasonic sensors, and/or transducers as described herein. Passive acoustic directional amplifier 1320 may be configured as any passive acoustic directional amplifier which is described or enabled herein. For example, passive acoustic directional amplifier 1320 can be passive acoustic directional amplifier 100 in FIGS. 1A-C, passive acoustic directional amplifier 200 in FIG. 2, passive acoustic directional amplifier 1010 in FIG. 10B-C or any other passive acoustic directional amplifier as described or enabled herein. Audio system 1300 can incorporate one or more passive acoustic directional amplifier(s) 1320 into various subsystems and applications within a vehicle 1310. According to various examples, audio system 1300 may comprise smart speakers, voice activated devices, vehicle infotainment systems, surveillance systems, audio conferencing systems, Bluetooth audio systems, audio VR, ultrasonic sensors, or systems for spatial location, detection, and discrimination of one or more objects, all of which can benefit from the incorporation of one or more passive acoustic directional amplifier 1320.

According to an embodiment, vehicle 1310 can comprise twelve passive acoustic directional amplifiers: 1330, 1332, 1334, 1336, 1338, 1340, 1342, 1344, 1346, 1348, 1350, and 1352. Each of the twelve passive acoustic directional amplifiers 1330-1352 are coupled to an ultrasonic sensor or ultrasonic receiver. The twelve ultrasonic sensors and their respective passive acoustic directional amplifiers can be positioned and oriented in a system for object detection, distance measuring, location positioning, range finding, and navigation. It is understood that many benefits can be provided by the use of passive acoustic directional amplifiers within vehicle systems for object detection, location, range finding, and navigation. For example, safety considerations in some jurisdictions require manufacturers to limit the output of an automotive ultrasonic transmitter to 100 dB sound pressure level (SPL). Due to their passive amplification and increased sensitivity, passive acoustic directional amplifiers as described herein can enable the use of ultrasonic transmitters at lower output dB SPL. Passive acoustic directional amplifiers 1330-1352 can be used in conjunction with automotive ultrasonic receivers for increased range of object detection. Each 12 dB increase from passive acoustic directional amplification for an automotive ultrasonic receiver can result in a doubling (due to the out-reflect-and-back effects) for object range detection.

According to some examples, vehicle 1310 comprises one or more passive acoustic directional amplifiers 1360 that can be used in conjunction with one or more electret, MEMS or condenser microphones. Such passive acoustic directional amplifier(s) 1360 can be located within the vehicle and can be configured to improve voice activated devices, vehicle infotainment systems, hands free cell phone communications, and/or communications with rear seat passengers.

Figure 14:
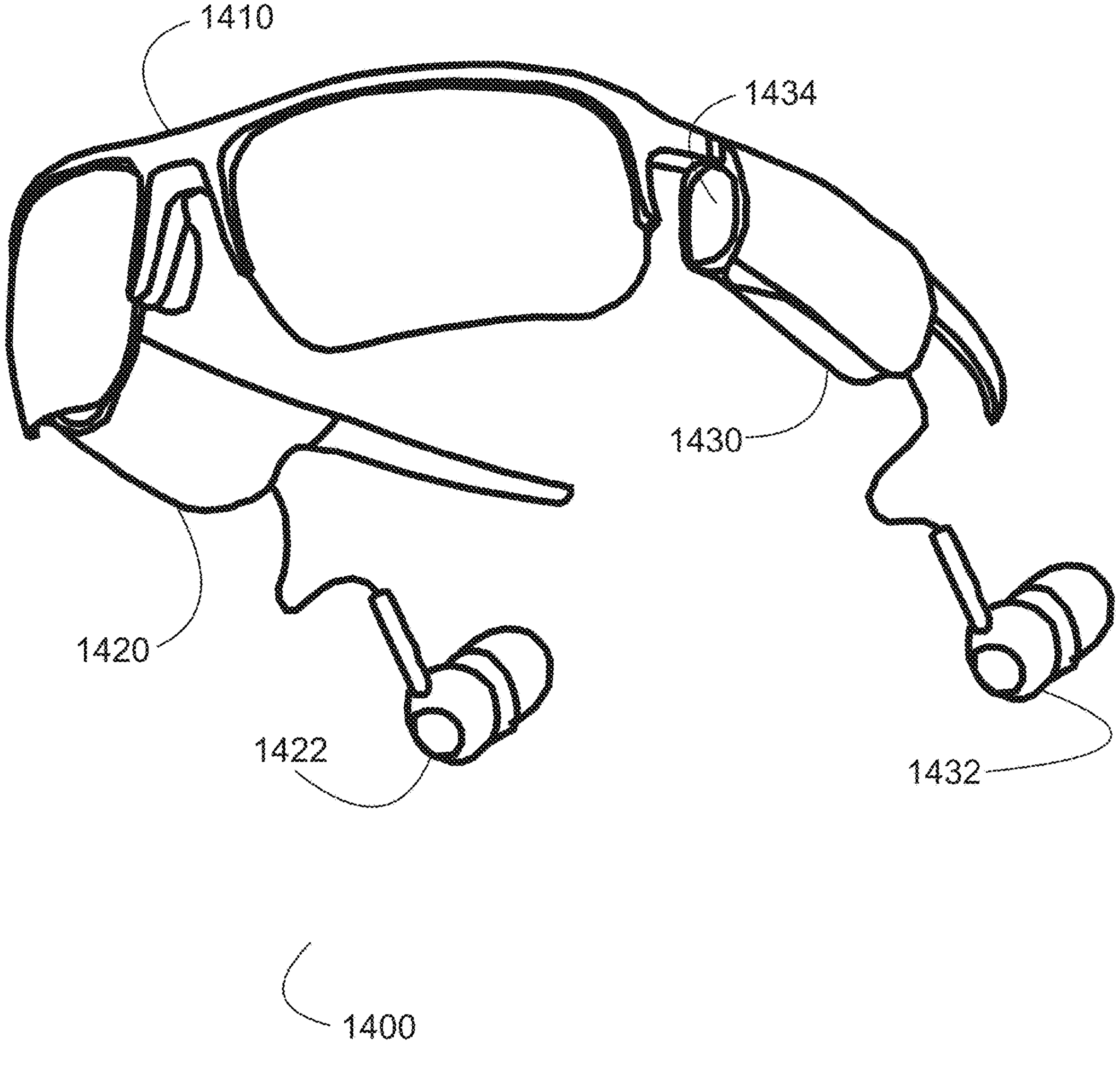
FIG. 14 illustrates an audio system comprising a passive acoustic directional amplifier in accordance with the present description.

FIG. 14 illustrates an audio system 1400 in accordance with the present description. Audio system 1400 comprises one or more passive acoustic directional amplifiers such as passive acoustic directional amplifiers 1420 and 1430. Passive acoustic directional amplifier 1420 and 1430 may be configured as any passive acoustic directional amplifier which is described or enabled herein. For example, passive acoustic directional amplifier 1420 and 1430 can be passive acoustic directional amplifier 100 in FIGS. 1A-C, passive acoustic directional amplifier 200 in FIG. 2, passive acoustic directional amplifier 1010 in FIG. 10B-C or any other passive acoustic directional amplifier as described or enabled herein.

In some examples, a wearable audio system 1410 or smart glasses 1410 can comprise two passive acoustic directional amplifiers 1420 and 1430, and two earbuds 1422 and 1432. Passive acoustic directional amplifiers 1420 and 1430 can be oriented in the forward direction 1434. Wearable audio system 1410 may also comprise one or more of the following components; a battery, a microphone or ultrasonic transducer, electronics, a wireless transmitter/receiver such as radio, Bluetooth, or Wi-Fi, processors, memory, and other electronic components.

Figure 15:
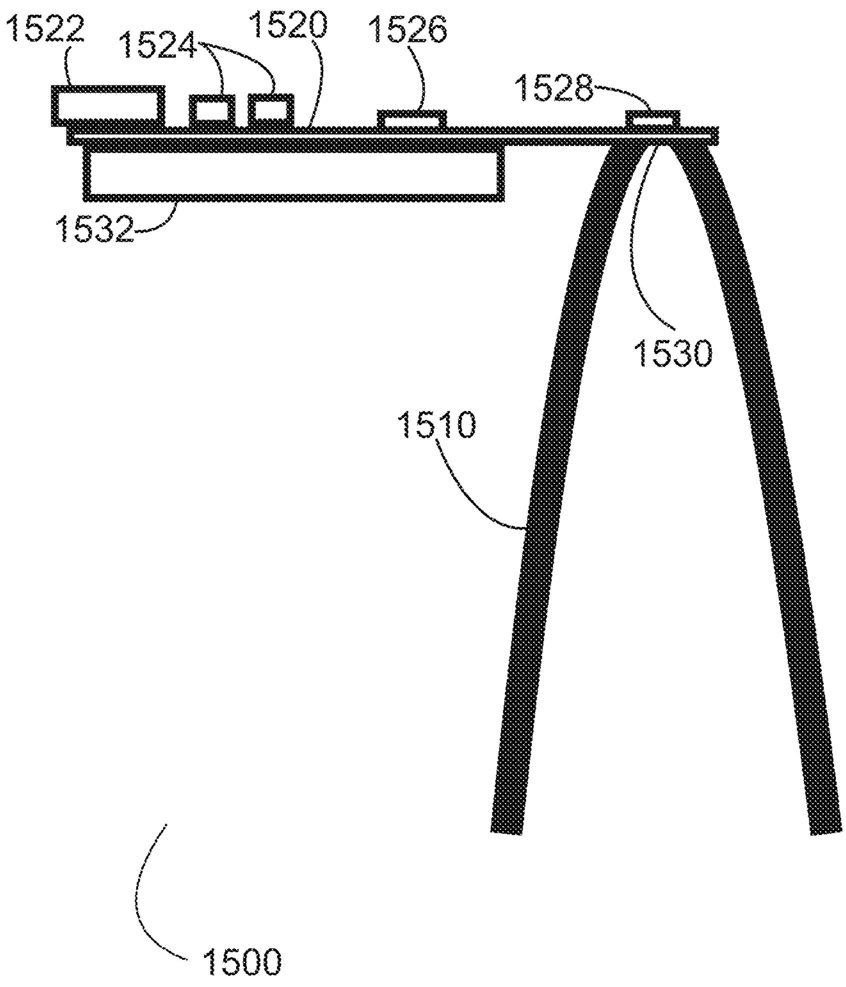
FIG. 15 illustrates a 2-dimensional cross-section view of a passive acoustic directional amplifier in accordance with the present description.

FIG. 15 illustrates a 2-dimensional cross-section view of an audio system 1500 or audio device 1500 in accordance with the present description. Audio system 1500 includes a passive acoustic directional amplifier 1510. Passive acoustic directional amplifier 1510 may be configured as any passive acoustic directional amplifier which is described or enabled herein. For example, passive acoustic directional amplifier 1510 can be passive acoustic directional amplifier 100 in FIGS. 1A-C, passive acoustic directional amplifier 200 in FIG. 2, shotgun amplifier 300 in FIG. 3 or any other passive acoustic directional amplifier as described or enabled herein. Audio system 1500 further comprises a support 1520 or circuit board 1520. Support 1520 or circuit board 1520 can have a microphone 1528, MEMS microphone 1528, sensor 1528, or transducer 1528 mounted thereon. In many examples, circuit board 1520 can comprise additional components, such as one or more of the following components: a USB connector 1522, one or more user input buttons 1524, a signal processor 1526, a transmitter and/or receiver, and/or a battery 1532. It is understood that each component can be mounted, coupled or electrically connected to circuit board 1520.

Passive acoustic directional amplifier 1510 comprises a hole 1530 located at the bottom of the cavity formed by passive acoustic directional amplifier 1510. In some examples, passive acoustic directional amplifier 1510 is attached to transducer 1528 and positioned so as to acoustically seal the bottom of passive acoustic directional amplifier 1510 to an open port of transducer 1528. In another embodiment, passive acoustic directional amplifier 1510 can be attached to circuit board 1520. In some embodiments, passive acoustic directional amplifier 1510 is attached to transducer 1528 via circuit board 1520. One of skill in the art will recognize that there are many materials, connectors, or means by which passive acoustic directional amplifier 1510 can be attached to circuit board 1520 or to transducer 1528.

Figure 16:
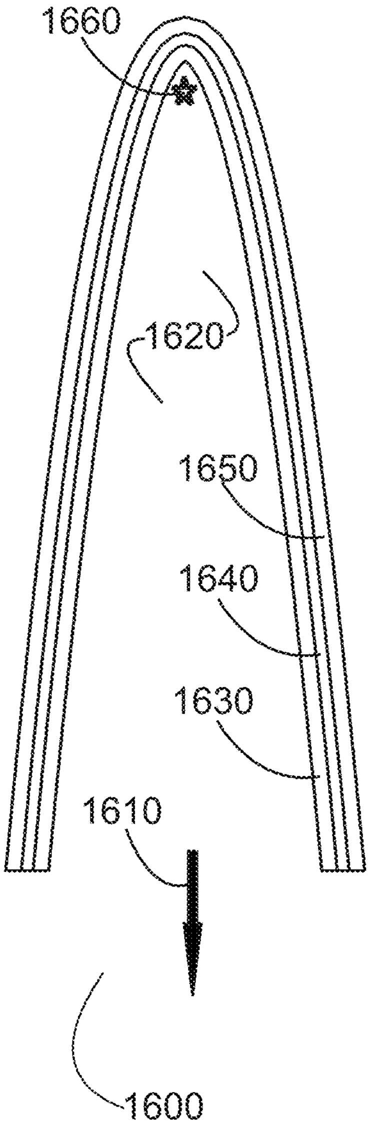
FIG. 16 illustrates a 2-dimensional cross-section view of a passive acoustic directional amplifier in accordance with the present description.

FIG. 16 illustrates a 2-dimensional cross-section view of an acoustic amplifier 1600, concave structure 1600, cupped structure 1600, or passive acoustic directional amplifier 1600 that can be used in conjunction with one or more microphones 1660, sensors 1660 and/or transducers 1660 as described herein. A transducer 1660 can be placed at or near the bottom of passive acoustic directional amplifier 1600. It is understood that microphones, sensors and transducers include, but are not limited to, MEMS microphones, electret microphones, condenser microphones, and ultrasonic sensors. Passive acoustic directional amplifier 1600 can be used in conjunction with many audio systems or devices in accordance with various embodiments described hereinafter. A cross-sectional view of passive acoustic directional amplifier 1600 is used to represent a 3-dimensional object once rotated around axis 1610 to create a cup-like 3-dimensional structure 1620. Passive acoustic directional amplifier 1600 comprises a concave inner structure 1630 or inner shell 1630, an outer structure 1650 or outer shell 1650 and a support structure 1640 or skeletal structure 1640. Outer structure 1650 may comprise a material that is in direct contact with an outer surface of support structure 1640 or is in indirect contact with an outer surface of support structure 1640 via an attachment material or materials. Inner shell 1630 may comprise a material that is in direct contact with an inner surface of support structure 1640 or is in indirect contact with an inner surface of support structure 1640 via an attachment material or materials. In some examples, inner shell 1630 and outer shell 1650 comprise as single material which completely encapsulates or encloses support structure 1640.

Outer structure 1650 and inner structure 1630 may comprise a first material having a first sound absorption coefficient and support structure 1640 may comprise a second material having a second sound absorption coefficient. In such examples, the first material of inner structure 1630 and outer structure 1650 can have a sound absorption coefficient that is higher than the sound absorption coefficient of the second material of support structure 1640. For example, the sound absorption coefficient of the first material may be at least 10% greater than the sound absorption coefficient of the second material, for sound at a frequency of 2,000 Hz that is generally directed at a 0-degree angle with respect to a normal line of the surface of either the first or second material. For example, the first material may comprise silicone rubber, while the second material may comprise an ABS plastic. In this configuration, support structure 1640 provides rigidity and support to passive acoustic directional amplifier 1600; inner structure 1630 improves the passive amplification of passive acoustic directional amplifier 1600; and outer structure 1650 attenuates sound arriving off axis of passive acoustic directional amplifier 1600, including attenuating the sound produced by impact, physical contact, movement or rubbing of outer structure 1650, such as when passive acoustic directional amplifier is held in the hand or pocket of a user.

In some examples, support structure 1640 may comprise a mesh, a screen, a wire screen, a welded wire screen or some other structural material or design which may be mechanically deformed so that at least portion of passive acoustic directional amplifier 1600 can be modified or contoured to fit a particular location of an individual's body, for example, against a portion of the neck, around the wrist or some other body part or object thereon. In other examples, support structure 1640 may comprise a thermal setting material which when heated, may be deformed, molded or contoured so that a portion of passive acoustic directional amplifier 1600 may be contoured so as to fit next to a portion of an individual's body surface or to fit next to an object. Still in other examples, the support structure 1640 or skeletal structure 1640 may comprise thin, semi-circular strips of rigid material which may be inserted at a later date by the consumer or others into passive acoustic directional amplifier 1600.

In one example, outer shell 1650 and inner shell 1630 may comprise platinum-catalyzed soft silicone rubber with a Shore-A hardness of 8. One skilled in the art will realize that skeletal structure 1640 may be porous such as a pre-formed wire screen which may be repeatedly dipped into platinum-catalyzed soft silicone rubber at intervals so as to create passive acoustic directional amplifier 1600. Skeletal structure 1640 can be formed from a variety of materials and that there are a variety of methods to configure passive acoustic directional amplifier 1600 around support structure 1640.

In some examples, outer structure 1650 and inner structure 1630 comprise a material having a hardness that is less than or equal to a Shore-A hardness of 100 (or an equivalent measure of hardness). In some examples, outer structure 1650 and inner structure 1630 comprise a material having a hardness that is less than or equal to a Shore-A hardness of 75. In a preferred example, outer structure 1650 and inner structure 1630 comprise a material having a hardness that is less than or equal to a Shore-A hardness of 50.

In some examples, support structure 1640 comprises a material having a hardness that is greater than or equal to a Shore-A hardness of 40 (or an equivalent measure of hardness. Outer structure 1650 and inner structure 1630 may comprise a first material having a first hardness coefficient and support structure 1640 may comprise a second material having a second hardness coefficient. In such examples, the first material of inner structure 1630 and outer structure 1650 can have a hardness coefficient that is lower than the hardness coefficient of the second material of support structure 1640. For example, the hardness coefficient of the second material may be at least 10% greater than the hardness coefficient of the first material. In another example, the hardness coefficient of the second material may be at least 100% greater than the hardness coefficient of the first material.

In some examples, outer structure 1650 and inner structure 1630 comprise a material having a Young's modulus that is less than or equal to 0.5 GPa (or an equivalent measure of stiffness/elasticity). In a preferred example, outer structure 1650 and inner structure 1630 comprise a material having a Young's modulus that is less than or equal to 0.1 GPa (or an equivalent measure of stiffness/elasticity).

In some examples, support structure 1640 comprises a material having a Young's modulus that is greater than or equal to a 0.5 GPa (or an equivalent measure of stiffness/elasticity). Outer structure 1650 and inner structure 1630 may comprise a first material having a first Young's modulus and support structure 1640 may comprise a second material having a second Young's modulus. In such examples, the first material of inner structure 1630 and outer structure 1650 can have a Young's modulus that is lower than the Young's modulus of the second material of support structure 1640. For example, the Young's modulus of the second material may be at least 10% greater than the Young's modulus of the first material. In another example, the Young's modulus of the second material may be at least 100% greater than the Young's modulus of the first material.

According to various embodiments, skeletal structure 1640 can be incorporated into any passive acoustic directional amplifier described or enabled herein.

Figure 17A:
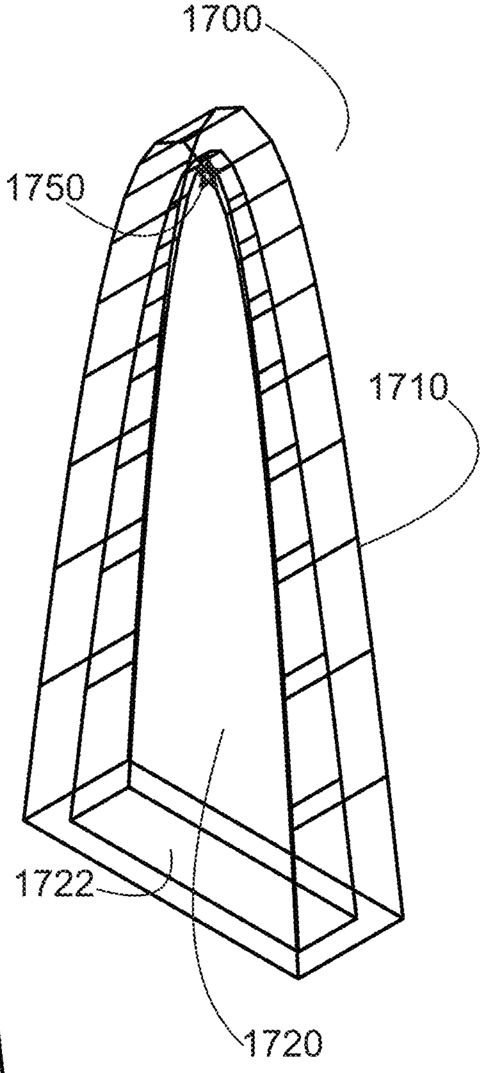
FIG. 17A illustrates a perspective view of a passive acoustic directional amplifier in accordance with the present description.
Figure 17B:
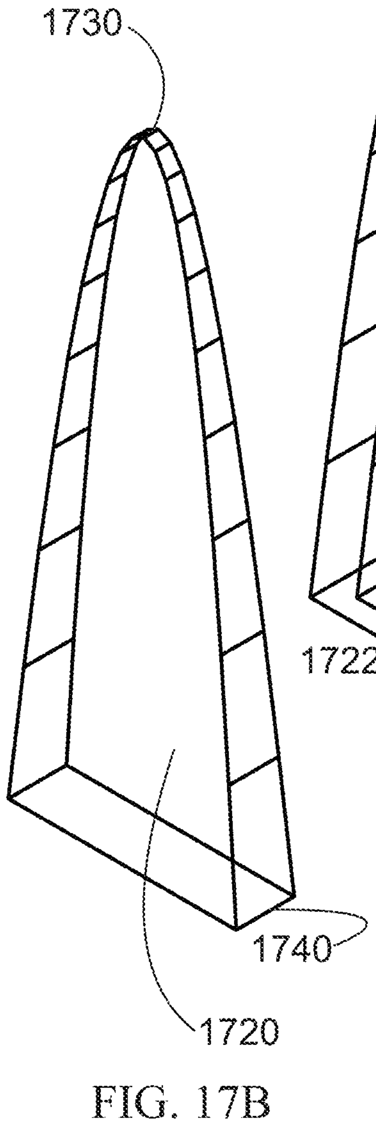
FIG. 17B illustrates a perspective view of an interior cavity of a passive acoustic directional amplifier in accordance with the present description.

FIG. 17A illustrates a perspective wireframe view of a passive acoustic directional amplifier 1700. In the present example passive acoustic directional amplifier 1700 comprises a 3-dimensional structure 1710 or a structure 1710. In the present example, 3-dimensional structure 1710 has an interior cavity 1720 within passive acoustic directional amplifier 1700. Passive acoustic directional amplifier 1700 has an opening 1722 or mouth 1722. From one perspective, interior cavity 1720 has a 2-dimensional cross-section view similar to curve 140 in FIG. 1C. From another perspective interior cavity 1720, as shown in FIGS. 17A and 17B, has a wedge-like structure which is narrower near the bottom 1730 of interior cavity 1720 than at the opening 1722 of passive acoustic directional amplifier 1700. A transducer 1750 is placed at or near the bottom 1730 of interior cavity 1720. The flattened-shape of passive acoustic directional amplifier 1700 can be unobtrusively incorporated into a variety of objects, such as, for example, a mobile phone case. In an additional embodiment, a skeletal structure 1640 from FIG. 16 can be incorporated into 3-dimensional structure 1710.

Figure 18:
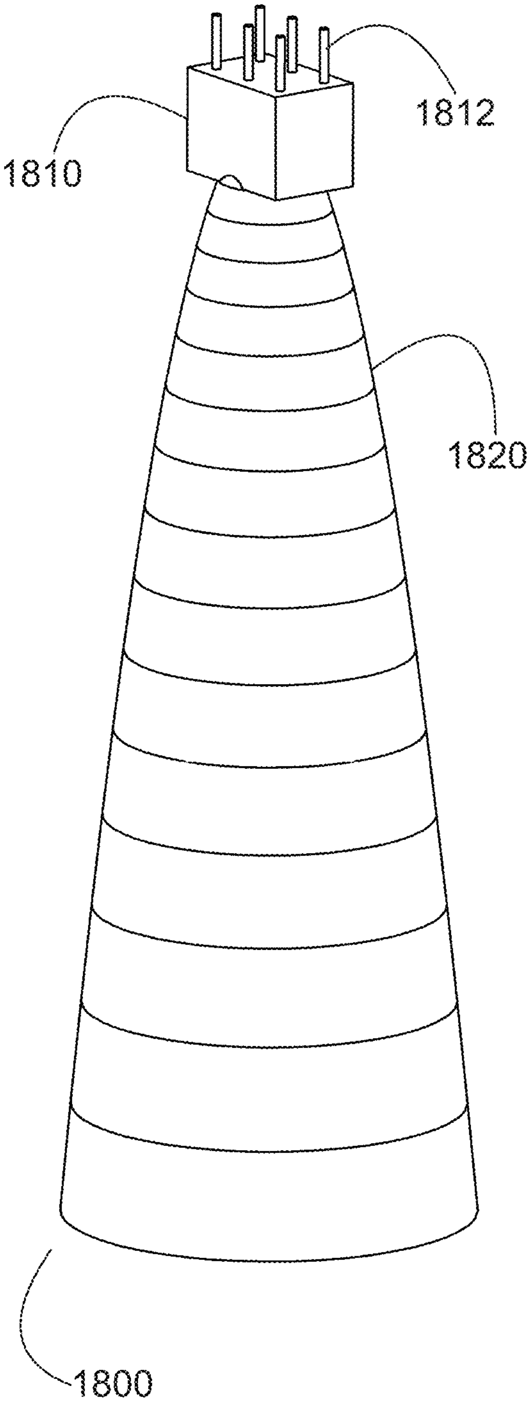
FIG. 18 illustrates a perspective view of a passive acoustic directional amplifier in accordance with the present description.

FIG. 18 illustrates a perspective view of an audio system 1800 or audio device 1800 in accordance with the present description. Audio system 1800 includes a passive acoustic directional amplifier 1820. Passive acoustic directional amplifier 1820 may be configured as any passive acoustic directional amplifier which is described or enabled herein. For example, passive acoustic directional amplifier 1820 can be passive acoustic directional amplifier 100 in FIGS. 1A-C, passive acoustic directional amplifier 200 in FIG. 2, shotgun amplifier 300 in FIG. 3 or any other passive acoustic directional amplifier as described or enabled herein. A chip 1810, transducer 1810, support 1810, circuit board 1810 or module 1810 can be attached or mounted directly or indirectly to passive acoustic directional amplifier 1820 so as to generally form a seal with passive acoustic directional amplifier 1820. Module 1810 can comprise a transducer capable of receiving or detecting sound energy within the cavity of passive acoustic directional amplifier 1820. The transducer may be any type of transducer described or enabled herein, including for example, an ultrasonic sensor. The transducer of module 1820 can have an opening or port which is located within the cavity of passive acoustic directional amplifier 1820. Module 1810 can comprise electrical connector 1812, connecting pin 1812 or pins 1812 which can be configured to be connected to an audio system such as a vehicle, a cell phone, a video camera, or any other audio system described or enabled herein.

Figure 19:
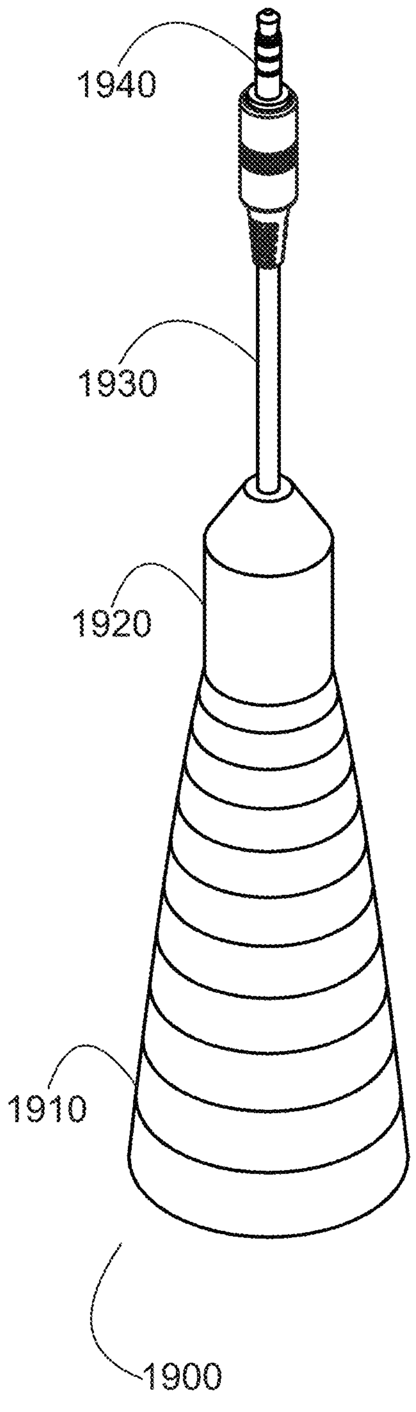
FIG. 19 illustrates a perspective view of a passive acoustic directional amplifier in accordance with the present description; and, FIG. 20 illustrates a perspective view of a passive acoustic directional amplifier in accordance with the present description.

FIG. 19 illustrates a perspective view of an audio system 1900 or audio device 1900 in accordance with the present description. Audio system 1900 includes a passive acoustic directional amplifier 1910. Passive acoustic directional amplifier 1910 may be configured as any passive acoustic directional amplifier which is described or enabled herein. For example, passive acoustic directional amplifier 1910 can be passive acoustic directional amplifier 100 in FIGS. 1A-C, passive acoustic directional amplifier 200 in FIG. 2, shotgun amplifier 300 in FIG. 3 or any other passive acoustic directional amplifier as described or enabled herein. Audio system 1900 further comprises a module 1920 or strain relief 1920. Module 1920 or strain relief 1920 can comprise electrical cable 1930 as well as other electrical components. Electrical cable 1930 can have an interface connector 1940. Interface connector 1940 may be a 3.5 mm male connector or other type of connector as is commonly known which can receive electrical power from a connected device and/or provide an audio signal or audio-related data to a connected system or connected device.

Figure 20:
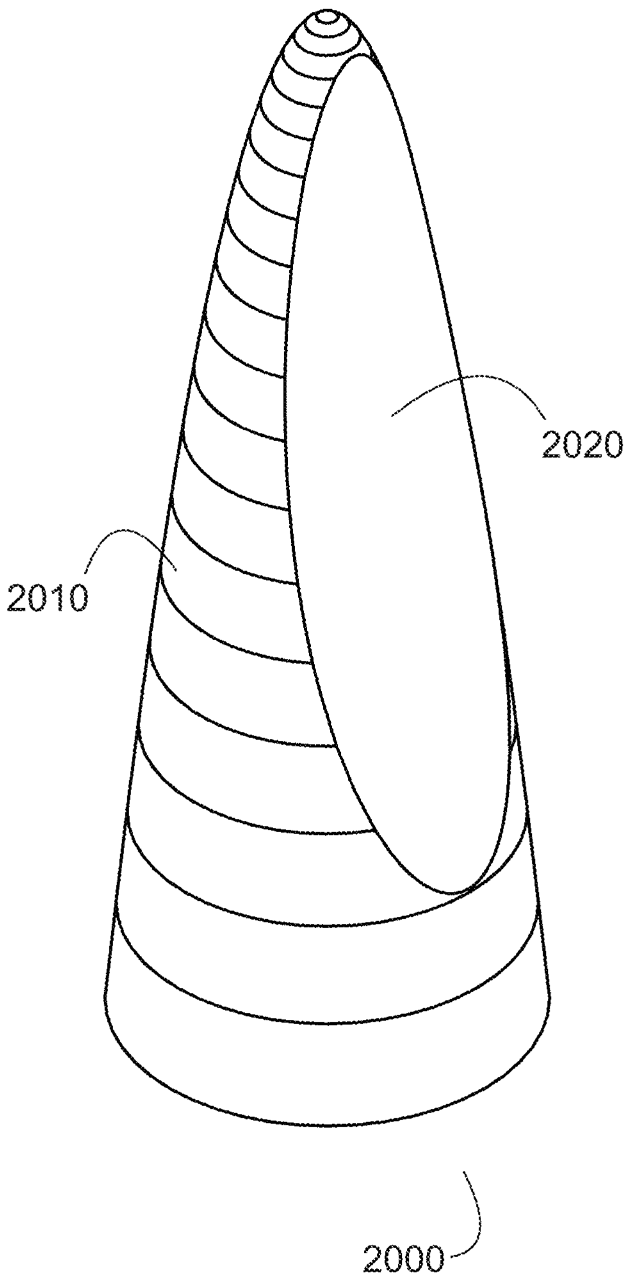

FIG. 20 illustrates a perspective view of passive acoustic directional amplifier 2000 having an exterior surface 2010 similar to exterior surface 114 in FIGS. 1A-B but which has been modified by depression 2020 or deformation 2020. Passive acoustic directional amplifier 2000 may be configured as any passive acoustic directional amplifier which is described or enabled herein. For example, passive acoustic directional amplifier 2000 can be passive acoustic directional amplifier 100 in FIGS. 1A-C, passive acoustic directional amplifier 200 in FIG. 2, passive acoustic directional amplifier 1600 in FIG. 16 or any other passive acoustic directional amplifier as described or enabled herein. In some examples, depression 2020 or deformation 2020 is the result of a flat or curved depression or deformation to the exterior surface 2010. In many examples, depression 2020 or deformation 2020 on exterior surface 2010 of passive acoustic directional amplifier 2000 is the reflective of, or similar to, a depression or deformation of the interior surface and cavity of passive acoustic directional amplifier 2000. In one example, depression 2020 or deformation 2020 of passive acoustic directional amplifier is created via a same or similar depression or deformation of a support structure or skeletal structure such as support structure 1640 or skeletal structure 1640 for passive acoustic directional amplifier 1600 in FIG. 16. In such an example, depression 2020 or deformation 2020 may become generally permanent by the depression or deformation made in the support structure or skeletal structure. In another example, depression 2020 or deformation 2020 in passive acoustic directional amplifier 2000 may be a feature included in the initial design and molding or construction of passive acoustic directional amplifier 2000. It is noted that depression 2020 or deformation 2020 may have size and shape characteristics other than a circular, flat or curved shape and may be imposed at any angle relative to passive acoustic directional amplifier 2000. Depression 2020 or deformation 2020 will benefit the positioning of passive acoustic directional amplifier 2000 against another body or surface. In one example, depression 2020 or deformation 2020 will limit passive acoustic directional amplifier 2000 from rolling when passive acoustic directional amplifier 2000 is placed on a flat surface.

FIG. 21 illustrates a perspective view of a passive acoustic directional amplifier 2100 comprising a 3-dimensional structure 2110 which is similar to 3-dimensional structure 110 in FIG. 1A-B but which has a modified rim 2120 or a facial surface 2120. Passive acoustic directional amplifier 2100 may be configured as any passive acoustic directional amplifier which is described or enabled herein. For example, passive acoustic directional amplifier 2100 can be passive acoustic directional amplifier 100 in FIGS. 1A-C, passive acoustic directional amplifier 200 in FIG. 2, passive acoustic directional amplifier 1600 in FIG. 16, passive acoustic directional amplifier 2000 in FIG. 20, or any other passive acoustic directional amplifier as described or enabled herein.

Passive acoustic directional amplifier 2100 forms a cavity having a bottom point 2316 which is located within the cavity formed by passive acoustic directional amplifier at a point at the bottom of the cavity or vertex of the cavity.

Passive acoustic directional amplifier 2100 comprises a rim 2120, or a facial surface 2120, which is similar to rim 132 that is depicted and described in relation to FIGS. 1A and 1B. Rim 2120 may have varying size and shape characteristics and may be circular, elliptical, flat, non-flat, and may be imposed at any angle relative to passive acoustic directional amplifier 2100. By configuring rim 2120 at an angle relative to passive acoustic directional amplifier 2100, a larger opening to the cavity of passive acoustic directional amplifier 2100 can be achieved without altering the shape and/or curvature of the remaining interior surface of the cavity of passive acoustic directional amplifier 2100. This configuration can increase the amount of sound energy entering into the cavity of passive acoustic directional amplifier 2100 while maintaining other attributes of passive acoustic directional amplifier 2100.

Rim 2120 comprises a lower rim point 2132 and an upper rim point 2134. Lower rim point 2132 is a point located along rim 2120 which is closer to bottom point 2136 than all other points along rim 2120. Upper rim point 2134 is a point located along rim 2120 which is further from bottom point 2136 than all other points along rim 2120. An angle, θ, is formed by points 2132, 2134, 2136. According to many examples, angle θ is between 8° and 82°. According to a preferred embodiment, angle θ is between 8° and 20°

According to various embodiments, passive acoustic directional amplifier 2100 also comprises a sensor 2138, microphone 2138 or transducer 2138, such as an ultrasonic sensor, an electret microphone, a condenser microphone, or a MEMS microphone. In some examples, transducer 2138 can be located within the cavity formed by passive acoustic directional amplifier 2100. According to some examples, transducer 2138 is located within a lower portion of the cavity formed by passive acoustic directional amplifier 2100. According to some examples, transducer 2138 is located at or near a bottom point 2136 within the cavity. According to one example, transducer 2138 can comprise a MEMS microphone having a port hole that is positioned within 8 millimeters of bottom point 2136. According to another example, the port hole of a MEMS microphone can be positioned within 15 millimeters of bottom point 2136. According to preferred embodiment, the port hole of a MEMS microphone can be positioned within 4 millimeters of bottom point 2136.

In reference to all of the foregoing disclosure, the above-described embodiments enable solutions, improvements, and benefits to address many problems and issues affecting conventional audio systems and conventional audio devices and offer improved functionality for audio systems and audio devices, for example:

First, amplifying an audio signal with a passive acoustic directional amplifier prior to the addition of the equivalent input noise (EIN) of a transducer will significantly improve the Speech Intelligibility Index (SII) from, for example, about 0.7629 to about 0.9864 at about 1 meter and from about 0.6165 to about 0.9196 at about 2 meters (29% and 49% improvements respectively). This can enable a transducer with an EIN of about 29 dBA to effectively match the performance of a transducer with an EIN of about 13 dBA.

Second, using a passive acoustic directional amplifier with a transducer improves the directional sensitivity of the transducer.

Third, using of a passive acoustic directional amplifier with a transducer increases the signal-to-noise ratio of the signal generated by the transducer which can make at-a-distance acoustic sound more tolerable for a user of an audio system and can increase the intelligibility of at-a-distance speech for a user of an audio system.

Fourth, using a passive acoustic directional amplifier with a transducer increases the signal-to-noise ratio of the signal generated by the transducer which can make noisy environments such as automobiles, crowds, restaurants, and classrooms more tolerable for a user of an audio system and increase speech intelligibility in noisy environments for a user of an audio system.

Fifth, using a passive acoustic directional amplifier with a transducer in combination with an interference tube increases off-axis sound rejection.

Sixth, using a passive acoustic directional amplifier with a transducer in combination with a parabolic reflector provides additional amplification for at-a-distance sound detection and recording.

Seventh, using an array of passive acoustic directional amplifiers with transducers, where each is focused on the same sound source, can further lower the effective EIN of the audio system and increase the quality of sound detection and recording.

Eighth, two passive acoustic directional amplifiers, each with a transducer, can be positioned and oriented to record studio quality stereo sound.

Ninth, using passive acoustic directional amplifiers with transducers in an array can enable studio quality recording and reproduction for acoustic virtual reality applications based on head orientation.

Tenth, using passive acoustic directional amplifiers with transducers in a network of arrays can enable studio quality recording and reproduction for acoustic virtual reality for some headphone applications based on head orientation and position translation.

Eleventh, using passive acoustic directional amplifiers with ultrasonic receivers can improve object range detection for vehicle applications with corresponding improvements in location positioning and navigation.

In view of the above it is evident that using passive acoustic directional amplifiers with transducers can improve at least the following characteristics of an audio system: improved at-a-distance speech intelligibility, low effective EIN, low cost, small size, improved signal-to-noise, and directional discrimination.

Benefits, other advantages, and solutions to problems and issues have been described above with regard to particular embodiments. Any benefit, advantage, solution to problem, or any element that may cause any particular benefit, advantage, or solution to occur or to become more pronounced are not to be construed as critical, required, or essential features or components of any or all the claims.

In view of all of the above, it is evident that novel audio systems, audio devices, microphones, and methods are disclosed.

While the subject matter of the invention is described with specific and example embodiments, the foregoing drawings and descriptions thereof depict only typical embodiments of the subject matter and are not therefore to be considered limiting of its scope. It is evident that many alternatives and variations will be apparent to those skilled in the art and that those alternatives and variations are intended to be included within the scope of the present invention. For example, some embodiments described herein include some elements or features but not other elements or features included in other embodiments, thus, combinations of features or elements of different embodiments are meant to be within the scope of the invention and are meant to form different embodiments as would be understood by those skilled in the art. Furthermore, any of the above-described elements, components, blocks, systems, structures, devices, ranges and selection of ranges, metadata, applications, programming, signal processing, signal analysis, signal filtering, implementations, proportions, flows, or arrangements, used in the practice of the present invention, including those not specifically recited, may be varied or otherwise particularly adapted to specific environments, users, groups of users, populations, manufacturing specifications, design parameters, or other operating requirements without departing from the scope of the present invention. Additionally, the steps recited in any method or processing scheme described above or in the claims may be executed in any order and are not limited to the specific order presented in the above description or in the claims. Finally, the components and/or elements recited in any apparatus claims may be assembled or otherwise operationally configured in a variety of permutations and are accordingly not limited to the specific configuration recited in the claims.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of the invention.

What is claimed is:

1. An audio system, comprising:

a three-dimensional structure comprising a material having a Young's modulus less than or equal to 0.5 GPa, wherein the three-dimensional structure has a concave interior surface forming a cavity, wherein the cavity has an opening and a vertex point located opposite the opening;

a MEMS microphone located within the cavity, wherein a port hole of the MEMS microphone is located within 10 millimeters of the vertex.

2. The audio system of claim 1, wherein at least a portion of the MEMS microphone is embedded in the three-dimensional structure.

3. The audio system of claim 1, further comprising an interference tube coupled to the three-dimensional structure and extending outward from the three-dimensional structure along the central axis.

4. The audio system of claim 1, wherein the audio system is a subsystem of a smart speaker.

5. The audio system of claim 1, wherein the audio system is a subsystem of a vehicle.

6. The audio system of claim 1, wherein the audio system is a subsystem of an autonomous vehicle.

7. The audio system of claim 1, wherein the audio system is a subsystem of a video camera.

8. The audio system of claim 1, wherein the MEMS microphone is located within 5 millimeters of the vertex.

9. The audio system of claim 1, wherein the opening has a width that is less than the depth of the cavity.

10. The audio system of claim 1, wherein the opening has a width that is less than one-half of the depth of the cavity.

11. The audio system of claim 1, wherein the interior cavity has a volume less than 40 ml.

12. The audio system of claim 1, wherein the interior cavity has a volume less than 7.9 ml.

* * * * *